US006996680B2

(12) United States Patent
Mogi et al.

(10) Patent No.: US 6,996,680 B2
(45) Date of Patent: Feb. 7, 2006

(54) DATA PREFETCHING METHOD

(75) Inventors: Kazuhiko Mogi, Yokohama (JP); Norifumi Nishikawa, Machida (JP); Hideomi Idei, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 10/647,261

(22) Filed: Aug. 26, 2003

(65) Prior Publication Data

US 2004/0193807 A1 Sep. 30, 2004

(30) Foreign Application Priority Data

Mar. 27, 2003 (JP) ............................ 2003-086829

(51) Int. Cl.
*G06F 12/06* (2006.01)

(52) U.S. Cl. ...................................................... 711/137

(58) Field of Classification Search ................ 711/137, 711/213; 707/3

See application file for complete search history.

(56) References Cited

U.S. PATENT DOCUMENTS

| | | | | |
|---|---|---|---|---|
| 5,799,309 | A | 8/1998 | Srinivasan | |
| 5,897,634 | A | 4/1999 | Attaluri et al. | |
| 6,065,013 | A | 5/2000 | Fuh et al. | |
| 6,539,382 | B1 | 3/2003 | Byrne et al. | |
| 6,606,617 | B1 | 8/2003 | Bonner et al. | |
| 6,728,726 | B1 | 4/2004 | Bernstein et al. | |
| 6,834,330 | B2 * | 12/2004 | Yechiel | 711/137 |
| 2002/0038313 | A1 | 3/2002 | Klein et al. | |
| 2002/0194155 | A1 | 12/2002 | Aldridge et al. | |
| 2003/0093442 | A1 | 5/2003 | Mogi et al. | |
| 2003/0093647 | A1 | 5/2003 | Mogi et al. | |
| 2003/0195940 | A1 | 10/2003 | Basu et al. | |
| 2003/0200282 | A1 * | 10/2003 | Arnold et al. | 709/219 |
| 2003/0220941 | A1 | 11/2003 | Arnold et al. | |
| 2003/0221052 | A1 * | 11/2003 | Yechiel | 711/111 |
| 2004/0117359 | A1 | 6/2004 | Snodgrass et al. | |
| 2004/0117398 | A1 | 6/2004 | Idei et al. | |
| 2004/0200282 | A1 | 10/2004 | Adnan et al. | |
| 2005/0080796 | A1 * | 4/2005 | Midgley | 707/100 |

OTHER PUBLICATIONS

"Informed Prefetching and Caching" R. Hugo Patterson et al, In Proc. of the 15th ACM Symposium on Operating System Principles. pp. 79-95, Dec. 1995.

"Automatic I/O Hint Generation through Speculative Execution" Fay Chang et al. the 3rd Symposium on Operating System Design and Implementation, Feb. 1999.

"Evaluation of Prefetching Mechanism Using Access Plan on Intelligent disk", The 11th data engineering workshop (DEWS2000), proceedings of lectures 3B-3, issued on Jul. 2000, CD-ROM, sponsored by Special Committee of Data Engineering, The Society of Electronic Information and Communication.

* cited by examiner

*Primary Examiner*—Kevin L. Ellis
(74) *Attorney, Agent, or Firm*—Mattingly, Stanger, Malur & Brundidge, P.C.

(57) ABSTRACT

A prefetching program preliminarily executes acquisition of SQL statements which are executed repeatedly and an analysis of a content of such processing so as to grasp data to be fetched in advance. Immediately before executing the processing, starting of the processing is notified to the prefetching program. Based on a preliminary analysis result and a given cache amount, the prefetching program issues a setting of the cache amount and an instruction of a data prefetching method to a DBMS and a storage device. The prefetching program receives a report on completion of the processing and, thereafter, issues a request for releasing a cache allocated for the processing to the DBNS and other storage devices.

20 Claims, 29 Drawing Sheets

F I G. 1
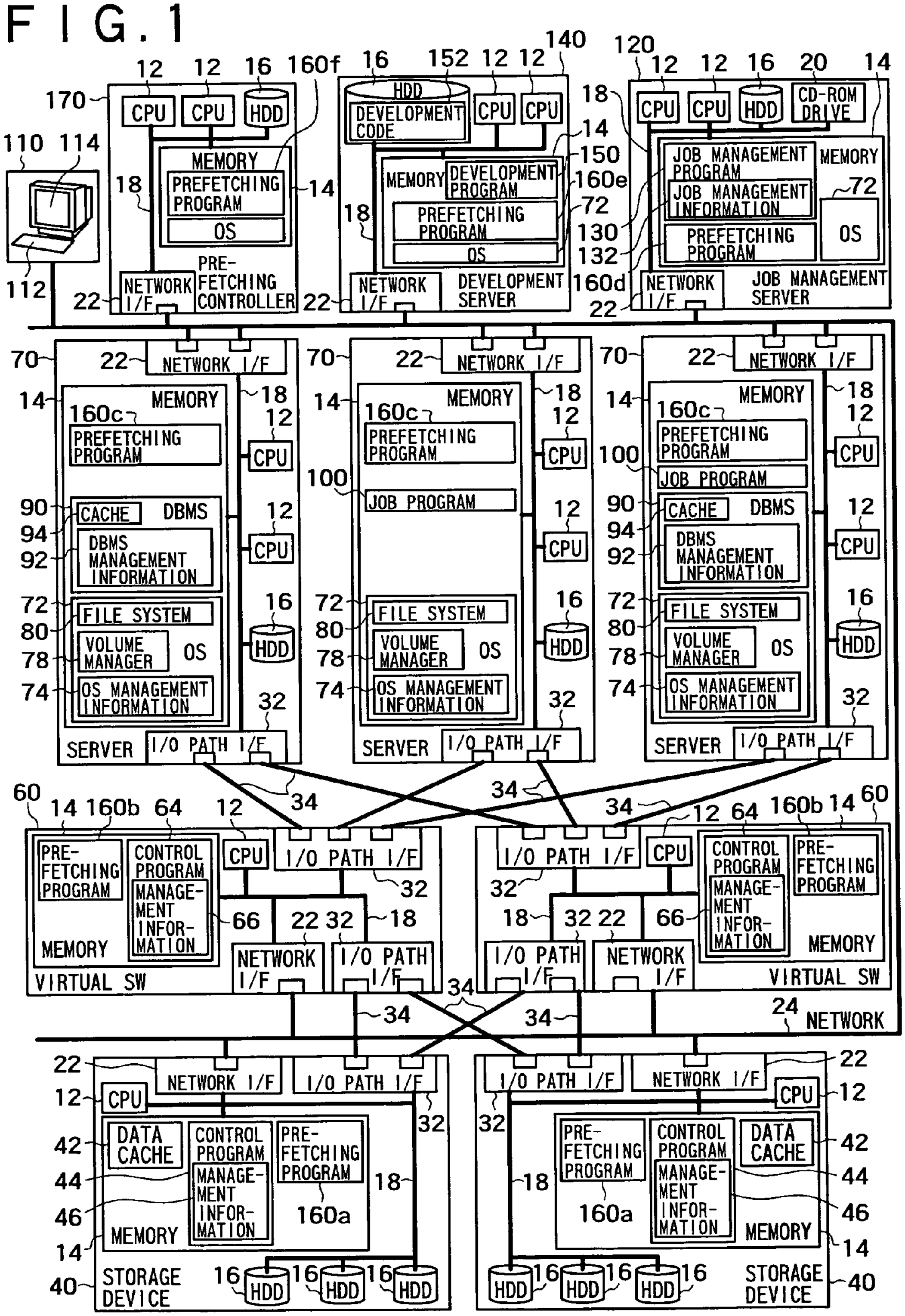

F I G. 3

310 312 314

| AREA INFORMATION OF UPPER VIRTUAL STRUCTURE | | CORRESPONDING AREA INFORMATION OF LOWER MANAGEMENT STRUCTURE | | |
|---|---|---|---|---|
| VIRTUAL STRUCTURE ID | INTER-STRUCTURAL AREA | VIRTUALIZING MACHANISM ID | MANAGEMENT STRUCTURE ID | INTER-STRUCTURAL AREA |
| Upper0 | 0-10239 | LowApp0 | Lower0 | 0-10239 |
| | 10240-20479 | LowApp1 | Lower1 | 0-10239 |
| Upper1 | 0-10239 | LowApp0 | Lower0 | 10240-20479 |
| | 10240-20479 | LowApp1 | Lower1 | 10240-20479 |
| Upper2 | 0-10239 | LowApp2 | Lower0 | 0-10239 |
| | 10240-20479 | LowApp2 | Lower1 | 0-10239 |
| ⋮ | ⋮ | ⋮ | ⋮ | ⋮ |

AREA MAPPING INFORMATION

| NAME OF DATA STRUCTURE | DATA STORAGE POSITION | |
|---|---|---|
| | NAME OF DATA FILE PATH | BLOCK NUMBER |
| T1 | /dev/rdsk/lvol0 | 0-499 |
| | /dev/rdsk/lvol0 | 2000-2499 |
| T2 | /dev/rdsk/lvol0 | 500-799 |
| T3 | /dev/rdsk/lvol1 | 500-799 |
| ⋮ | ⋮ | ⋮ |

DATA STORAGE AREA INFORMATION

FIG.5

| | | | | |
|---|---|---|---|---|
| NAME OF DATA STRUCTURE | T1 | T2 | ... | 521 |
| DATA PAGE SIZE | 16KB | 8KB | ... | 522 |
| NUMBER OF DATA PAGES | 61897 | 78783 | ... | 524 |
| CACHE QUANTITY | 1024 PAGES | 2048 PAGES | ... | 526 |

TABLE DATA QUANTITY INFORMATION

| | | | | | |
|---|---|---|---|---|---|
| NAME OF DATA STRUCTURE | Ind1-1 | | Ind2-1 | ... | 531 |
| NAME OF CORRESPONDING TABLE | T1 | | T2 | ... | 532 |
| TYPE OF INDEX | B-Tree | | BitMap | ... | 534 |
| DATA PAGE SIZE | 8kB | | 8kB | ... | 533 |
| NUMBER OF DATA PAGES | 3782 | | 6782 | ... | 535 |
| NUMBER OF LEAF NODE PAGES | 2898 | | - | ... | 536 |
| CACHE QUANTITY | 1452 PAGES | | 50 PAGES | ... | 537 |
| RETRIEVAL ATTRIBUTE | ID1 | (ID1, ID2) | ID2 | ... | 538 |
| EXPECTATION TUPLE NUMBER | 5.5 | 1 | 2058.2 | ... | 542 |

INDEX INFORMATION 530

FIG. 11

```
...
for(i=0;i<records;i++){
...
name=in_name[i]; addr=in_addr[i]; pay=i[i];
EXEC SQL SELECT C_ID,C_ID INTO:c_id,:c_d_id
 FROM  Cust
 WHERE C_Name=:name and C_Addr=addr
 FOR UPDATE;

EXEC SQL UPDATE Cust
 SET   C_Balance=C_Balance-:pay
 WHERE C_ID=:c_id;
...
COMMIT;
}
...
```

5002

SAMPLING PROCESSING

5014

```
...
HINT REPEAT START LABEL(L_records_1)
```

5012

```
SELECT C_ID,C_ID
 FROM  Cust
 WHERE C_Name=:name and C_Addr=addr
 FOR UPDATE;

UPDATE Cust
 SET   C_Balance=C_Balance-:pay
 WHERE C_ID=:c_id;
...
COMMIT;
```

5010

```
HINT REPEAT END;
```

EXECUTION PLAN 570

| NAME OF NODE (572) | NAME OF PARENT NODE (574) | CONTENT OF NODE PROCESSING (576) | ACCESS DATA STRUCTURE (578) | DETAIL OF NODE PROCESSING (582) |
|---|---|---|---|---|
| N-1-1 | root | Sum | - | Sum(T1,B) |
| N-2-1 | N-1-1 | Nested Loop Join | - | T1,Key1=T3,Key1 |
| N-3-1 | N-2-1 | Hash Join | - | T3,Key3=T4,Key4 |
| N-3-2 | N-2-1 | Table Access by Index | T1 | - |
| N-4-1 | N-3-1 | Table Access Full | T3 | - |
| N-4-2 | N-3-1 | Filter | - | T4,M<100 |
| N-4-3 | N-3-2 | Index Access | Ind1-1 | Key1=[RESULT OF N-3-1] |
| N-5-1 | N-4-2 | Table Access Full | T4 | - |

FIG.17

| | | | |
|---|---|---|---|
| NAME OF DATA STRUCTURE | T1 | T2 | ... |
| CACHE QUANTITY | 1024 PAGES | 2048 PAGES | ... |

711, 712

SETTING OF CACHE QUANTITY

| | | | |
|---|---|---|---|
| NAME OF DATA STRUCTURE | T1 | Ind2-1 | ... |
| CACHE METHOD | SEQUEN-TIAL | INSTANT PREFETCHING | ... |
| DRIVE ID | Str2 | Str1 | ... |
| CACHE QUANTITY | 4MB | 40MB | ... |
| ACCESS ORDER | 1 | 2 | ... |

721, 722, 723, 724, 725

PREFETCHING METHOD

| | | | | |
|---|---|---|---|---|
| GROUPING | | 1 | 2 | ... |
| DATA AREA | VIRTUAL STRUCTURE IDENTIFIER | LU1 | LU2 | ... |
| | AREA | 10240-819199 | 81920-163839 | ... |
| CACHE METHOD | | SEQUENTIAL | INSTANT PREFETCHING | ... |
| CACHE QUANTITY | | 4MB | 40MB | ... |
| ACCESS ORDER | | 1 | 2 | ... |

CACHE INSTRUCTION 732, 734, 735, 736, 737, 730

```
CREATE PROCEDURE proc_pay (IN name,IN address, IN pay)
BEGIN
 DECLAREc_id   NUMBER(10);
 DECLAREc_d_id NUMBER(10);

SELECT C_ID,C_ID INTO:c_id,d_id
 FROM  Cust
 WHERE C_Name=:name and C_Addr=addr
 FOR UPDATE;

UPDATE Cust
 SET   C_Balance=C_Balance-pay
 WHERE C_ID=c_id;
...
COMMIT;
END
```

FIG. 25

```
...
for(i=0;i<records;i++){
...
name=in_name[i]; addr=in_addr[i]; pay=i[i];
EXEC SQL SELECT C_ID,C_ID INTO:c_id,:c_d_id
 FROM  Cust
 WHERE C_Name=:name and C_Addr=:addr
 FOR UPDATE;
EXEC SQL UPDATE Cust
 SET   C_Balance=C_Balance-:pay
 WHERE C_ID=:c_id;
...
COMMIT;
}
```

5002

...

HINT EMBEDDING PROCESSING

...

```
EXEC SQL HINT REPEAT START COUNT (;records;)
```

5022 5024

```
EXEC SQL HINT EXEC_SQL
"SELECT C_ID,C_ID
 FROM  Cust
 WHERE C_Name=dummy1 and C_Addr=dummy2
 FOR UPDATE;
 ...
 COMMIT;"
```

5026 5010

```
for(i=0;i<records;i++){
...
name=in_name[i]; addr=in_addr[i]; pay=i[i];
EXEC SQL SELECT C_ID,C_ID INTO:c_id,:c_d_id
 FROM  Cust
 WHERE C_Name=:name and C_Addr=:addr
 FOR UPDATE;
EXEC SQL UPDATE Cust
 SET   C_Balance=C_Balance-:pay
 WHERE C_ID=:c_id;
...
COMMIT;
}
```

5002

```
EXEC SQL HINT REPEAT END;
```

5028

...

DATA PREFETCHING METHOD

BACKGROUND OF THE INVENTION

1. Field of the Invention

The present invention relates to a method for enhancing access to a storage device, and more particularly to an access enhancing method by data prefetching in a storage device of a computer system operated by a database management system (DBMS).

2. Description of the Prior Art

Recently, along with the increase of a data amount handled by a system, a data based management system (DBMS) which is served for managing the data is becoming extremely important. Since the performance of the DBMS is closely related to the access performance to data stored in a storage device from a computer, to enhance the performance of the DBMS, the enhancement of the access performance to the storage device from the computer becomes extremely important.

In general, in the storage device, there has been adopted a technique in which a high-speed accessible data cache which temporarily holds data in the storage device is prepared, and a state in which data is present in cache (hereinafter referred to as "hit") is created at the data leading time thus enhancing the access performance. Accordingly, to enhance the access performance of the storage device, it is very important to preliminarily read out (hereinafter "prefetch") data which are predicted to be used before an actual access command arrives.

In a non-patent literature 1 "Informed Prefetching and Caching" written by R. Hugo Patterson et al, In Proc. of the 15$^{th}$ ACM Symposium on Operating System Principles. Pp.79–95, December. 1995, a function of an operation system (hereinafter referred to as "OS") which prefetches data into a file cache on the computer using a hint issued by a program and a control method are discussed. In this non-patent literature 1, the program is amended by an administrator or the like such that the program issues hints related to files to be accessed hereinafter and areas to be accessed.

In a non-patent literature 2 "Automatic I/O Hint Generation through Speculative Execution" written by Fay Chang et al. the 3$^{rd}$ Symposium on Operating System Design and Implementation, February. 1999, a technique which exhibits a further progress compared to the technique disclosed in the non-patent literature 1 is disclosed. Here, to issue the hints, an amendment is added to a program such that processing which is expected to be executed hereinafter is executed in a speculative manner at the I/O standby time and the hints are issued based on the result of processing. Further, a tool which is served for automatically performing the correction of program is also disclosed.

In a non-patent literature 3 "Evaluation of Prefetching Mechanism Using Access Plan on Intelligent disk", The 11$^{th}$ data engineering workshop (DEWS2000), proceedings of lectures 3B-3, issued on July 2000, CD-ROM, sponsored by Special Committee of Data Engineering, The Society of Electronic Information and Communication, there is disclosed a technique on a data prefetching method in which a storage device acquires an execution plan of inquiry processing which is expected to be executed by DBMS and which makes use of the execution plan are disclosed. Upon receiving the execution plan of processing, the storage device reads an index for a table in which DBMS is present and, thereafter, determines a block in which data of the corresponding table is stored. Then, the storage device continuously reads out the data on indexes and grasps a group of blocks which hold the data of the table whose access address is determined by the index, and the access to the group of blocks is scheduled whereby the prefetching can be executed effectively. Particularly, the storage device can execute this processing independently from the computer in which the DBMS is executed.

Among processing executed on the DBMS, there exists processing which executes, a large number of times, processing given by processing statements which are described using a structured query language (hereinafter referred to as "SQL") (hereinafter referred to as "SQL statement") having an equal form. In this case, it is difficult to specify the data to be prefetched corresponding to one processing. However, on the premise that the processing having the equal form are executed a large number of times, it is possible to discriminate a memory area of data which can be accessed by processing executed a large number of times with high probability and the memory area can be prefetched.

However, in the non-patent literature 1, although the evaluation of advantageous effects attributed to the DBMS is performed, the repeated execution of the processing using the SQL statement having the equal form is not described. Further, in the non-patent literature 2, although the utilization of result of speculative execution of processing for acquiring the advantageous effect even when the accessed data is changed corresponding to the input data is disclosed, the features of the input data (that is, the features of the SQL statement in the DBMS) is not taken into consideration.

Further, in the non-patent literature 3, with respect to the information given to the storage device, there is no description other than the execution planning. Accordingly, the information which discriminates the repeating of the SQL statement in the equal form is not transmitted and hence, the prefetching of data which requires the repeated execution of the SQL statement as the premise cannot be executed.

SUMMARY OF THE INVENTION

Accordingly, it is an object of the present invention to enhance the access performance of a storage device when the processing given by the SQL statements in the equal form can be repeatedly performed a large number of times in a computer system which is operated by a DBMS.

In the present invention, a prefetching program which manages prefetching of data acquires information related to an SQL statement which is executed repeatedly and execution starting information of the processing and, thereafter, issues a prefetching instruction of data to a storage device based on these information.

In a preferred example (a first method), the acquisition of the SQL statement which is executed repeatedly and a prefetching program for analyzing a content of processing are executed in advance so as to grasp data to be prefetched in advance. Immediately before executing the processing, starting of processing is notified to the prefetching program. The prefetching program issues setting of a cache amount and the instruction of prefetching method data to a DBMS and the storage device based on a result of the preliminary analysis and a given cache amount. The prefetching program receives a report of completion of processing and, thereafter, issues a request for releasing an allocated cache for processing to the DBMS and the storage device.

In a preferred another example (a second method), the SQL statement which is executed repeatedly is given to the prefetching program from the processing program at the time of starting processing. The prefetching program executes an analysis of the given SQL statement and issues setting of a cache amount and instruction for prefetching method of data to the DBMS and the storage device based on an analysis of a given SQL statement and setting of a given cache amount. The prefetching program receives a report of completion of repetition processing and, thereafter, issues a request for releasing an allocated cache for processing to the DBMS and the storage device.

In still another example (a third method), the prefetching program is executed such that the prefetching program constitutes a front end program of the DBMS. The prefetching program usually receives the SQL statement from the processing program, transfers the SQL statement to the DBMS, receives a result of processing from the DBMS, and returns the result of processing to the processing program. When the SQL statement which is given hereinafter notifies that the repetition processing is performed to the prefetching program, upon reception of the SQL statement, the analysis is executed, setting of a cache amount and the instruction of prefetching method of data are issued to the DBMS and the storage device based on the result of analysis and setting of a given cache amount and, thereafter, the SQL statement is transferred to the DBMS. When the prefetching program receives a report on completion of repetition processing, the prefetching program issues a request for releasing an allocated cache for processing to the DBMS and the storage device.

On the premise that processing in the equal form is executed a large number of times, a storage area of data which is accessed at high probability acquires an execution plan of the SQL statement used in the processing from the DBMS and acquires the data access address, the access method and the access sequence grasped from the execution plan of the SQL statement.

BRIEF DESCRIPTION OF THE DRAWINGS

FIG. 1 is a view showing the constitution of a computer system according to the first embodiment;

FIG. 3 is a view showing the data structure of area mapping information 310;

FIG. 4 is a view showing the data structure of data storage area information 510;

FIG. 5 is a view showing the data structure of table data amount information 520;

FIG. 6 is a view showing the data structure of index information 530;

FIG. 11 is a view showing an example of sampling processing in the first embodiment;

FIG. 15 is a view showing the data structure of an execution plan 570;

FIG. 17 is a view showing the data structure of cache amount setting 710;

FIG. 18 is a view showing the data structure of a prefetching method 720;

FIG. 19 is a view showing the data structure of cache instruction 730;

FIG. 23 is a view showing an example of declaration of stored procedure;

FIG. 25 is a view showing a modification of the second embodiment;

DESCRIPTION OF PREFERRED EMBODIMENTS

Figure 2:
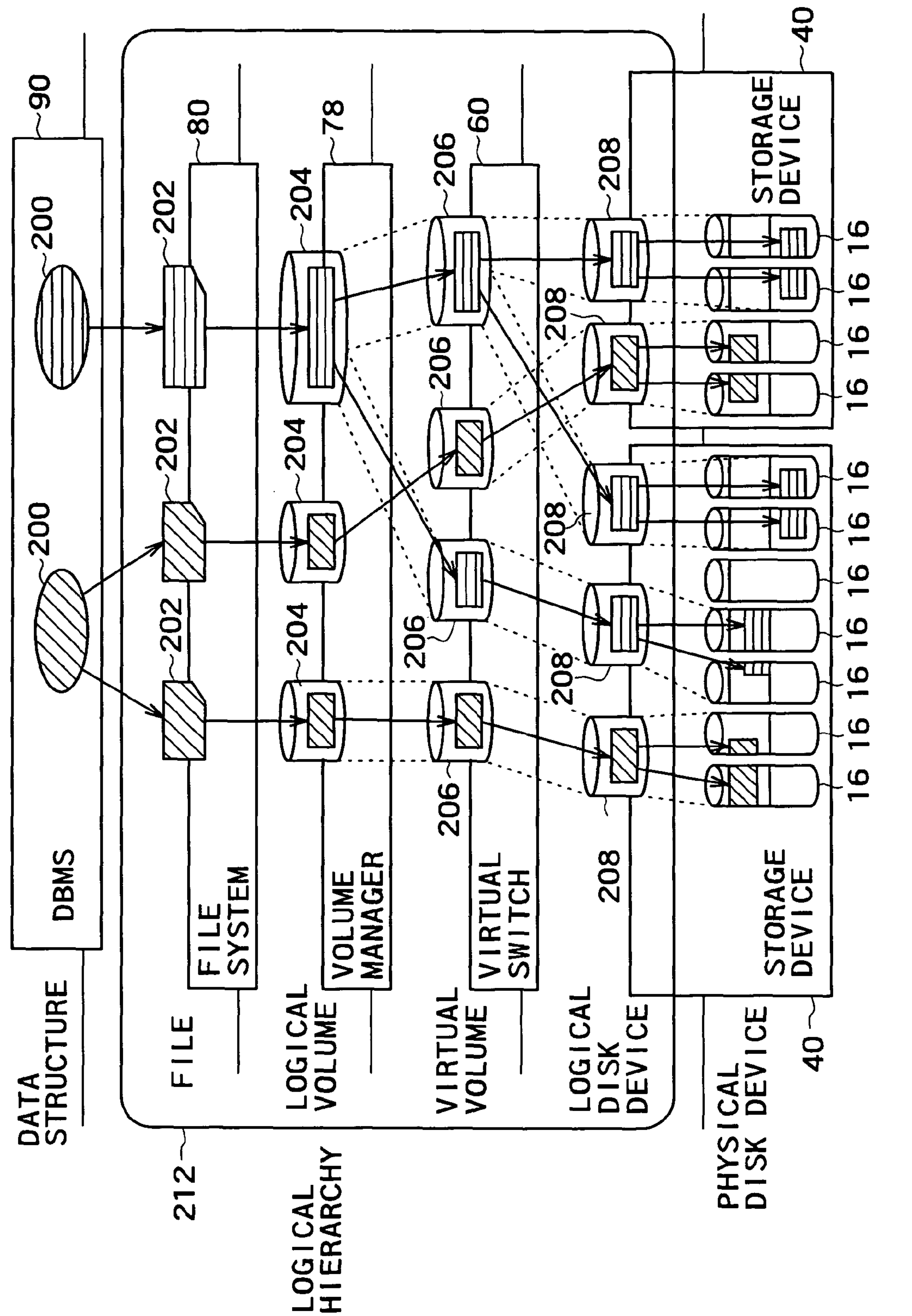
FIG. 2 is a view showing a concept of a hierarchical structure of data mapping of the first embodiment.

Preferred embodiments of the present invention are explained hereinafter. However, the present invention is not limited by these embodiments.

First of all, the first embodiment is explained. A computer system according to the first embodiment performs the acquisition of an SQL statement which is repeatedly executed and an analysis of contents of processing in advance by the execution of a prefetching program performed by a computer. Thereafter, upon notification of processing starting of process based on the SQL statement which is repeatedly executed, the computer issues prefetching instruction to a storage device based on a result of the preliminary analysis.

FIG. 1 is a view showing the constitution of the computer system of the first embodiment. The computer system includes a storage device 40, a computer (hereinafter referred to as "server") 70 which uses the storage device 40, a computer (hereinafter referred to as "Job management server") 120 which performs the execution management of a Job program 100, a computer (hereinafter referred to as "development server") 140 which is used for developing of the program, a computer (hereinafter referred to as "prefetching controller") 170 which is served for executing the prefetching program 160, and a virtualization switch 60 which performs imaginary processing of a storage area. Respective devices include networks I/F 22 and they are connected to a network 24 through the networks I/F 22 so that respective devices can be communicated with each other.

The server 70, the virtualization switch 60 and the storage device 40 respectively includes I/O passes I/F 32 and are connected to a communication line (hereinafter referred to as "I/O pass") 34 through these I/O passes I/F 32. The I/O processing between the server 70 and the storage device 40 is performed using the I/O pass 34. Here, as the I/O pass 34, a communication line which performs data transfer using a physical medium which differs between devices or a protocol which differs between devices may be used. Further, the network 24 and the I/O pass 34 may share the same communication line.

The storage device 40 includes a CPU 12, a memory 14, a disk device (hereinafter referred to as "HDD") 16, a network I/F 22 and the I/O path I/F 32 and these are connected to each other through an internal bus 18. Here, the HDD 16 may be formed in a single number or in a plural number. A storage area of the memory 14 is physically divided into a non-volatile area and a high performance area.

A control program 44 which is a program for controlling the storage device 40 and a prefetching program **160*a* are stored in the non-volatile area of the memory 14 and are executed by the CPU 12 after being transferred to the high performance area of the memory 14 at the time of starting. All functions which the storage device 40 has are controlled by the control program 44 except for the functions which are controlled by the prefetching program 160*a*** described later.

Further, by executing the control program 44, the storage device 40 communicates with an external device using the network I/F 22 and the I/O path I/F 32, while the prefetching program **160*a* is also communicable with the outside using the network I/F 22 and the I/O path I/F 32**.

Management information 46 which the control program 44 uses for controlling and managing the storage device 40 is stored in the memory 14. Further, a portion of the high performance area of the memory 14 is allocated to a data cache 42 which constitutes a area for temporarily storing data to which a request for access is made from an external device. Here, data requiring high reliability such as data unwritten to the HDD 16 may be stored in the non-volatile area of the memory 14.

The storage device 40 virtualizes a physical storage area which the HDD 16 has and provides 1 or a plurality of logical disk device (hereinafter referred to as "LU") 208 to the external device. The LU 208 may correspond to the HDD 16 in the one-to-one relationship or may correspond to a storage area which is constituted of a plurality of HDD 16. Further, one HDD 16 may correspond to a plurality of LU 208. These corresponding relationships are held in a form of area mapping information 310 in the management information 46.

The storage device 40 performs setting and releasing of allocation of the storage area within the data cache 42 of a designated amount with respect to areas designated by LU 208 based on the information of data area in the cache instruction 730 and the information of the cache amount. This setting and releasing of cache is dynamically performed (hereinafter, dynamically means "executed without stopping other processing"). The storage device 40 manages caches which have the same values with respect to grouping which is included in the cache instruction 730 as one area.

Further, a user of the computer system or the like instructs the storage device 40 from the external device to instantly prefetch data with respect to the area of the data cache 42 by instructing the cache method contained in the cache instruction 730 (hereinafter referred to as "instant prefetching"), to prefetch assuming that all access requests are sequentially continued (hereinafter referred to as "sequential") with respect to the area of data cache 42, or to release the current setting (hereinafter referred to as "releasing of setting"). Further, the storage device 40 determines the order of prefetching based on information of access order in the cache instruction 730. Here, the cache instruction 730 is given by the prefetching program **160*a***.

A virtualization switch 60 includes a CPU 12, a memory 14, a network I/F 22 and the I/O passes I/F 32 and these are connected to each other through an internal bus 18. A storage area of the memory 14 is physically divided into a non-volatile area and a high performance area.

A control program 64 which is a program for controlling the virtualization switch 60 and a prefetching program **160*b* are stored in the non-volatile area of the memory 14 and are executed by the CPU 12 after being transferred to the high performance area of the memory 14 at the time of starting. A function which the virtualization switch 60 provides is controlled by the control program 64. Further, by executing the control program 64, the virtualization switch 60 communicates with an external device using the network I/F 22 and the I/O passes I/F 32, while the prefetching program 160*b* is also communicable with the outside using the network I/F 22 and the I/O path I/F 32**.

Further, in the memory 14, management information 66 which the control program 64 utilizes for controlling and managing the virtualization switch 60 is stored.

The virtualization switch 60 recognizes the LU 208 supplied from the storage device 40 which is connected to the device of the present invention, and provides a virtual volume 206 to an external device by virtualizing a storage area of the LU 208. Here, when the virtualization switches 60 are connected in a multi-stages, the virtualization switch 60 handles the virtual volume 206 which is provided by other virtualization switch 60 equivalently with the LU 208 which is provided by the storage device 40 and supplies the virtual volume 206 to the external device by virtualizing the storage area of the LU 208. The corresponding relationship between the LU 208 and the virtual volume 206 is held as area mapping information 310 in the management information 66.

A server 70 includes CPUs 12, a memory 14, a network I/F 22 and an I/O path I/F 32 and these are connected to each other through an internal bus 18. In the memory 14, an OS 72 and a prefetching program **160*c* are read from the HDD 16 and are executed by the CPUs 12. The detail of the prefetching program 160*c*** will be explained later in detail.

OS 72 is constituted of, in contrast with the programs which are executed on the server 70, a group of programs which are executed in the CPUs 12 for providing basic processing, for example, a hardware control of the network I/F 22 and the I/O path I/F 32 or the like, communication with other devices through the network 24, data transfer processing through the I/O pass 34, an execution control among a plurality of programs, statement exchanges among a plurality of programs including programs executed by external devices, reception of request requesting start of programs from external devices or the like. OS 72 further includes a volume manager 78 and a file system 80. The OS72 which is read by the memory 14 includes OS management information 74 as the management information used by programs which constituting the OS 72 or other OS 72. The OS management information 74 includes information on the hardware structure of the server 70. The OS 72 includes a software interface for allowing an external program to read the information stored in the OS management information 74. Further, although the server 70 has only one file system 80 in the drawing, the server 70 may have a plurality of file systems 80.

The volume manager 78 is a program which is executed in the server 70 for providing the file system 80 with a logic volume 204 which further virtualizes storage areas of LU 208 provided by the storage device 40 and the virtual volume 206 provided by the virtualization switch 60. The corresponding relationship between the virtual volume 206 and the logic volume 204 is maintained in a form of area mapping information 310 in the OS management information 74.

The file system 80 is a program which is executed in the server 70 for virtualizing the storage areas of the LU 208 provided by the storage device 40, the virtual volume 206 provided by the virtualization switch 60 and the logic volume 204 provided by the volume manager 78 and for providing other programs with the file 202. The corresponding relationship between the file 202 and the logic volume 204 or the like is maintained as area mapping information 310 in the OS management information 74. Further, using the software interface equal to the file 202, the low device function which directly accesses the storage areas of the logic volume 204, the virtual volume 206 and the LU 208 is also provided by the file system 80.

The DBMS 90 is a program which is executed by the server 70 for executing a series of processing/management with respect to the DB. This program is read from the HDD 16 or the storage device 40 into the memory 14 and is executed by the CPU 12. The DBMS 90 which is read into the memory 14 has the DBMS management information 92 as management information of DBMS 90. The DBMS management information 92 includes data storage area information 510 as the management information of the storage area of tables, indexes, logs or the like (hereinafter referred to as "data structure" collectively) which the DBMS 90 uses/manages. Further, in executing the DBMS 90, the server 70 uses the area of the memory 14 as a cache 94 and manages the minimum use amount thereof for every data structure. The DBMS 90 has a software interface for allowing external programs to read the DBMS management information 92. Further, the DBMS 90 has a software interface for outputting the execution plan 570 of processing based on the given SQL statement 700.

Here, in general, a plurality of programs are executed in parallel in one computer and processing is performed in a cooperative manner through the exchange or transaction of statements among these programs. Accordingly, actually, a plurality of programs are executed in a CPU (or a plurality of CPUs) and the statement exchange is performed through the areas on the memory 14 managed by the OS 72 or the like. However, in order to simplify the explanation, in this specification, the above-mentioned statement exchange or the like is explained in such a manner that the program executed by the CPU is used as a subject (or an object).

The Job program 100 is a program which is executed on the server 70 as a user operation. The Job program 100 issues a processing request to the DBMS 90. With respect to the Job program 100, the Job management program 130 issues a starting command to the OS 72 through a network and the Job program 100 is read from the HDD 16 or the storage device 40 into the memory 14 and is executed by the CPU 12.

Further, the Job program 100 may always issue a request for processing to the DBMS 90 when the Job program 100 handles the data which is stored in the storage device 40. In this case, the server 70 which executes the Job program 100 may not include the I/O path I/F32. Further, the Job program 100 may be constituted of a program which transforms source codes into an execution form or may adopt a form in which a program written by a processing language (hereinafter referred to as "SQL script") based on the SQL statements in a manner that, when the program is executed, the program is given to a script execution program and the script execution program executes the program while interpreting the program.

A plurality of DBMS 90 and a plurality of Job programs 100 can be executed simultaneously on one server 70. Further, the DBMS 90 and the Job program 100 may be executed on the different servers 70. In this case, the Job program 100 transmits the processing request to the DBMS 90 via the network 24.

The Job management server 120 includes CPUs 12, a memory 14, a HDD 16, a CD-ROM drive 20 and a network I/F 22 and these are connected to each other through an internal bus 18. In the memory 14, an OS 72, a Job management program 130 and a prefetching program **160*d* are read from the HDD 16 and are executed by the CPU 12. The detail of the prefetching program 160*d*** will be explained later.

The Job management program 130 is a program for realizing a Job management function which the Job management server 120 possesses and includes the Job management information 132 as management information necessary for realizing the function in the memory 14.

A development server 140 includes CPUs 12, a memory 14, a HDD 16 and a network I/F 22 and these are connected to each other through an internal bus 18. In the memory 14, an OS 72, a development management program 150 and a prefetching program **160*e* are read from the HDD 16 and executed by the CPU 12. The detail of the prefetching program 160*e*** will be explained later.

The development program 150 is a program which is used by a manager or the like of a system for developing the Job program 100. The development program 150 stores a development code 152 including source codes of the Job program 100 and other information necessary for development of programs in the HDD 16 in the development server 140.

A prefetching control device 170 includes CPUs 12, a memory 14, a HDD 16 and a network I/F 22 and these are connected to each other through an internal bus 18. In the memory 14, an OS 72 and a prefetching program **160*f* are read from the HDD 16 and are executed by the CPU 12. The detail of the prefetching program 160*f* will be explained later. Here, it is not always necessary to provide the prefetching control device 170**.

Management terminals 110 each having an input device 112 such as a keyboard or a mouse and a display screen 114 are connected to each other via the network 24. This connection may use a communication line different from the network 24. The manager issues various instructions to various computers or executes other processing via the management terminal 110 in principle.

The OS 72, the DBMS 90, the Job program 100, the development program 150 and the prefetching program

160*c*, 160*d*, 160*e*, 160*f* are read from the CD-ROM (storage media) which stores them using the CD-ROM drive 20 included in the management server 120 and are installed in the HDD 16 or the storage device 40 in the server 70, the management server 120, the development server 150 and the prefetching control device 170 via the network 24.

Further, in the drawing, although the Job management program 130 and the development program 150 are executed using the computer other than the computer of the server 70, these programs may be executed on the server 70. When the Job management program 130 is executed on the server 70, the CD-ROM drive 20 is held by any of the servers 70 and used for installing various programs.

FIG. 2 is a view showing a hierarchical structure of data mapping of data which is managed by the DBMS 90 in the first embodiment. In the drawing, a case in which one virtualization switch 60 is present between the server 70 and the storage device 40 is explained. Hereinafter, with respect to arbitrary two layers, the layer arranged close to the DBMS 90 is referred to as an upper layer and the layer arranged close to the HDD 16 is referred to as a lower layer. A file 202, a logic volume 204, a virtual volume 206 and a LU 208 are collectively referred to as "virtual structure" and, further, the virtual structure together with the HDD 16 is collectively referred to as "management structure". Further, the storage 40, the virtualization switch 60, the volume manager 78 and the file system 80 which provide the virtual structure are collectively referred to as "virtualization mechanism".

In FIG. 2, the DBMS 90 gets access to a file 202 storing a data structure 200 which is managed by the DBMS 90. The file 202 is provided by a file system 80 and the file system 80 converts the access to the file 202 into an access to a logic volume 204 area corresponding to the file 202. The volume manager 78 converts the access to the logic volume 204 into an access to a virtual volume 206 area corresponding to the logic volume 204. The virtualization switch 60 converts the access to the virtual volume 206 into an access to a LU 208 area corresponding to the virtual volume 206. The storage device 40 converts the access to the LU 208 into an access to a HDD 16 corresponding to the LU 208. Thus, the virtualization mechanism performs mapping of the virtual structure data which is provided by the virtualization mechanism to the upper layer in the storage area of one or more management structures existing in the lower layer.

A plurality of routes may be present for the mapping of certain virtual structure data into the HDD 16. Alternatively, the mapping of the same part of the virtual structure data may be performed in the management structures of a plurality of lower layers. In this case, the information that the virtualization mechanism has such a mapping is held in a area mapping information 310.

Further, a certain management structure may include mapping shared by a plurality of servers 70. This is used in the server 70 having a fail-over constitution and the DBMS 90 which is executed in the server 70.

In this embodiment, it is sufficient when the corresponding relationship of data among the management structures in the logic layer 212 is clarified and it is not always necessary that the server 70 uses the volume manager 78. The virtualization switch 60 may be present in plural stages. Alternatively, the server 70 and the storage device 40 may be directly connected through the I/O pass 34 without using the virtualization switch 60. When a switch which corresponds to the virtualization switch 60 has no virtual function of the storage area, this structure is equivalent to the structure in which the server 70 and the storage device 40 are directly connected. When there exists no virtualization switch 60 or when the switch which corresponds to the virtualization switch 60 has no virtual function of the storage area, it is not always necessary to provide the prefetching program 160*b*.

The respective devices or the data structures which are held by the programs are explained hereinafter.

FIG. 3 is a view showing the data structure of a area mapping information 310. The area mapping information 310 holds the corresponding relationship between the virtual structure area provided by the virtualization mechanism and the management structure area used by the virtualization mechanism and includes an entry 312 and an entry 314. In the entry 312, information regarding the area of the virtual structure which the virtualization mechanism provide to the upper layer is registered. To be more specific, the entry 312 includes a set of entries consisting of an entry which holds virtual structure IDs as identifiers of the virtual structure and an entry indicating the areas within the structures thereof. In the entry 314, information on areas of the management structure in the lower hierarchical layer corresponding to the entry 312 are registered. To be more specific, the entry 314 includes a set of entries consisting of an entry which holds a virtualizing mechanism ID which constitutes an identifier of the management structure and an entry which indicates the internal structure area. Here, in the storage device 40, the entry having the virtualization mechanism ID is not held.

As mentioned above, the different virtual structures are allowed to use the storage area having the same management structure. Further, the virtualization mechanism ID, the virtual structure ID and the management structure ID constitute identifiers which are univocally defined within the system. Even not so, the identifiers can be defined univocally within the system by adding an identifier of the device to them.

FIG. 4 is a view showing the data structure of data storage area information 510 which is held in the DBMS management information 92. The data storage area information 510 is served for managing of storage area of data which the DBMS 90 manages. The data storage area information 510 is constituted of a set of entries consisting of an entry 512 which holds data structure names which are names of data structure and an entry 514 which holds data storage locations which are information regarding the locations in the file 202 where the corresponding data structures are stored. Further, the data structure names are names which are univocally determined within the DBMS 90 and, when the same name is allowed for every DB within the DBMS 90, the data structure names including the DB identifier are used.

FIG. 5 is a view showing the data structure of table data amount information 520 which is held in the DBMS management information 92. The table data amount information 520 is information which is served for data amount management of the table. The table data amount information 520 includes an entry 521 which holds table data structure names and an entry 522 which holds data page sizes which are information with respect to the sizes of the data page of the table, an entry 524 which holds data page numbers used by the table and an entry 526 which holds a cache amount which is information with respect to the minimum amount of the cache 94 which can be used by the data.

FIG. 6 is a view showing the data structure of index information 530 held in the DBMS management information 92. The index information 530 is information used for managing the indexes of the DBMS 90. The index information 530 is constituted of a set of entries consisting of an entry 531 which holds data structure names of the index, an entry 532 which holds corresponding table names which are data structure names of the tables to which the indexes are added, an entry 534 which holds index types, an entry 533 which holds data page sizes, an entry 535 which holds data page numbers, an entry 536 which holds Leaf node page numbers which are data page numbers holding leaf node data when a B-Tree index is adopted out of the data pages, an entry 537 which holds a minimum available cache quantities of the index, an entry 538 which holds retrieval attributes which are a set of attribute names of the attributes by which the retrieval is performed using the index, and an entry 542 which holds expected tuple numbers which are information of tuple numbers which are expected to be acquired by one retrieval in the retrieval attribute. Here, there may be a case that a plurality of retrieval attributes and corresponding expected tuple numbers are present in one index. Further, the expected tuple number is a value acquired by data analysis of the corresponding table and an average value, a mode value or a value calculated from the respective indicators is used.

Figure 7:
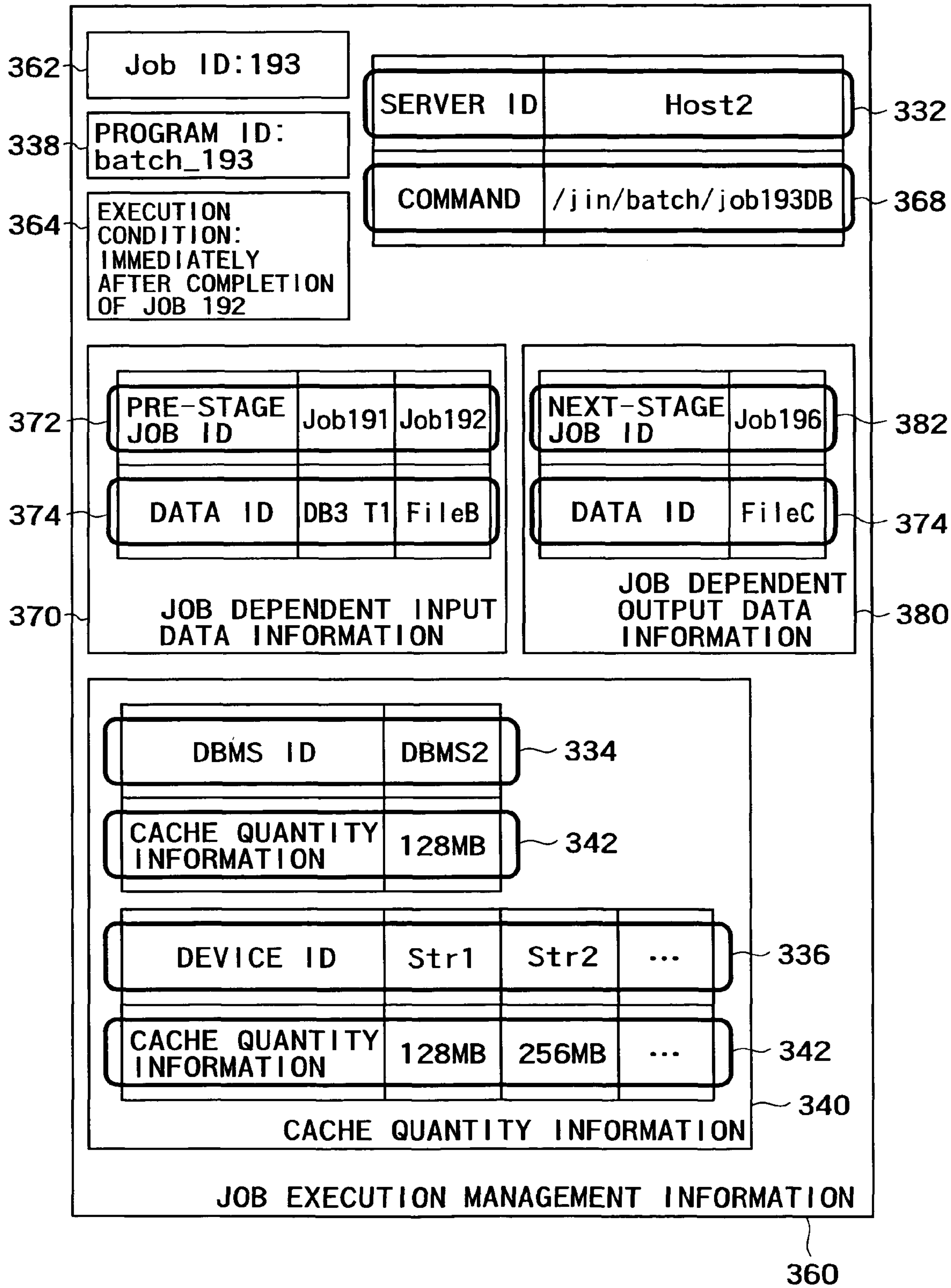
FIG. 7 is a view showing the data structure of Job execution management information.

FIG. 7 is a view showing the data structure of Job execution management information 360 which is held in the Job management information 132. The Job execution management information 360 is used when the Job management program 130 manages the execution of the Job program 100. The Job execution management information 360 is held each time the Job is executed.

The Job execution management information 360 includes an entry 362 which holds a Job ID which constitutes an identifier of the Job, an entry 338 which holds a program ID which constitutes an identifier of the Job program 100 executed as a Job, an entry 364 which holds an execution condition which constitutes an execution starting condition of the Job, a set of entries consisting of an entry 332 which holds a server ID which constitutes an identifier of the server 70 which executes the Job and an entry 368 which holds a command executed by the server 70, an entry 370 which holds Job dependent input information, an entry 380 which holds Job dependent output data information and an entry 340 which holds cache amount information.

The Job dependent input information is information on data which is used when the Job is executed. The entry 370 further includes a set of entries consisting of an entry 372 which holds Job IDs of the preceding-stage Job which outputs data to be used and an entry 374 which holds data IDs which constitute identifiers of the input data.

The Job dependent output data information is information on the output data of the present Job used for execution of other Job. The entry 380 further includes a set of entries consisting of an entry 382 which holds a Job ID of the Job which will use the output data and an entry 374 which holds a data ID which constitutes an identifier of the output data.

The cache amount information is information on the minimum available cache amount for the data accessed in the present processing in the DBMS 90 or the storage device 40 in executing the Job program 100 at the time of starting Job. The entry 340 further includes a set of entries consisting of an entry 334 which holds a DBMS ID which constitutes an identifier of the DBMS 90 in which the processing is executed and an entry 342 which holds a cache amount which constitutes information on the amount of the cache 94 available in the DBMS 90 and a set of entries consisting of an entry 336 which holds device IDs which constitute identifiers of the storage devices 40 holding data which are used for the processing and an entry 342 which holds cache quantities which constitute quantities of data caches 42 which are available there. Further, it is not always necessary to hold the cache amount information 340.

Hereinafter, the prefetching program 160 which is used in this embodiment is explained. The prefetching program 160 is realized using the prefetching programs 160*a*, 160*b*, 160*a*, 160*d*, 160*e*, 160*f* as components which are executed in the respective devices. Among the components of the prefetching programs 160 which are present among a plurality of devices, necessary information is exchanged through the network 24. With respect to the processing of the respective functional modules which will be explained hereinafter, in principle, the processing may be realized in any device and each function module per se may be divided into and realized as a plurality of devices.

However, with respect to acquisition of information/processing condition from other programs or the parts which perform instruction/request of processing, the prefetching program 160*a* performs such operation with respect to a control program 44 of the storage device 40, the prefetching program 160*b* performs such operations with respect to the control program 64 of the virtualization switch 60, the prefetching program 160*a* performs such operations with respect to the OS 72 of the server 70, the volume manager 78, the file system 80 and the DBMS 90, the prefetching program 160*d* performs such operations with respect to the Job management program 130 of the Job management server 120, and the prefetching program 160*e* performs such operations with respect to the development program 150 of the development server 140.

However, it is possible to make a more general-use program function which is provided by the OS 72 or the like replace these functions. In this case, the corresponding prefetching programs 160*a*, 160*b*, 160*a*, 160*d*, 160*e* may not be executed. Further, the prefetching programs 160*a*, 160*b*, 160*a*, 160*d*, 160*e*, 160*f* may be realized as functions of other programs, especially, as a part of the DBMS 90 or the Job management program 130.

Figure 8:
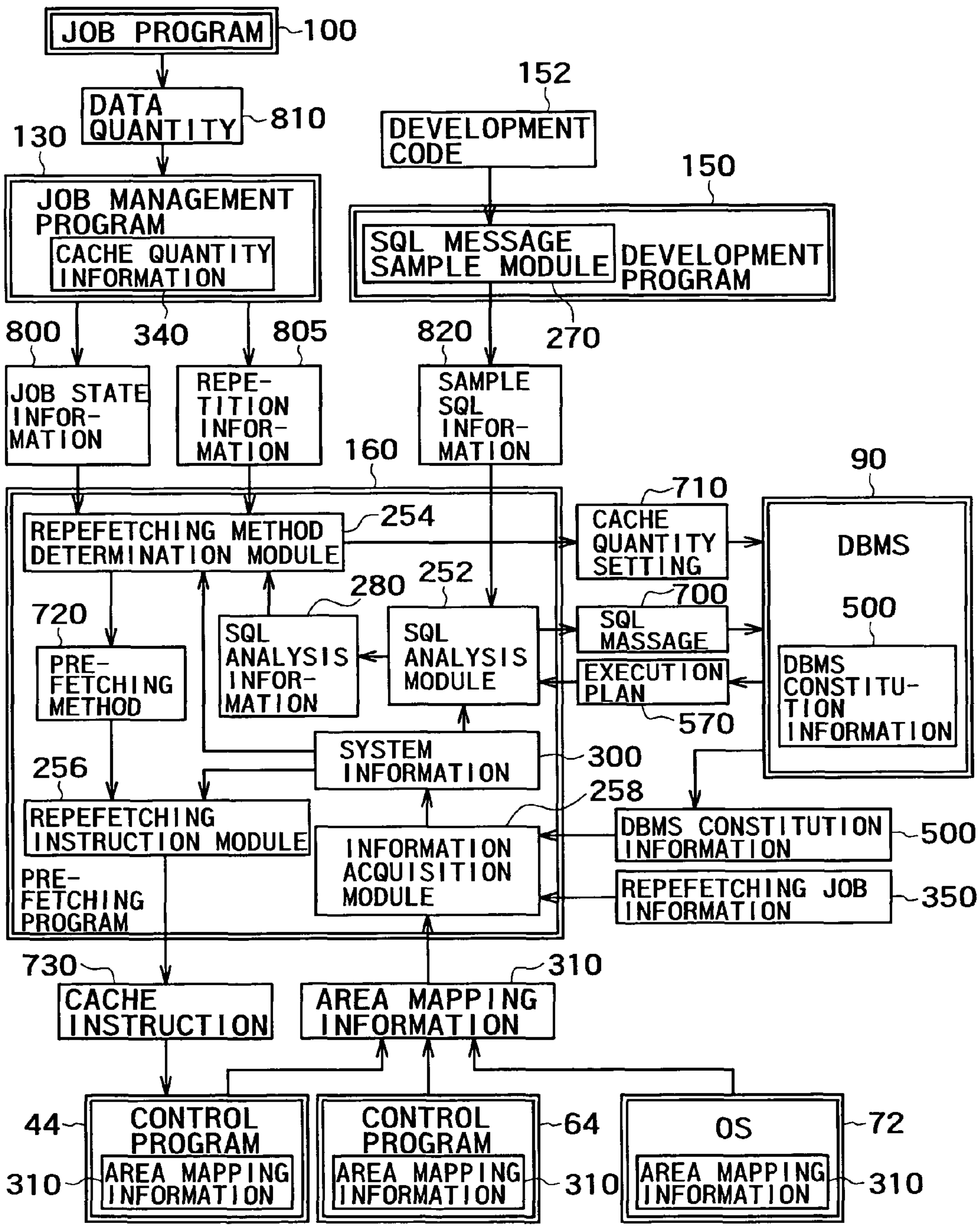
FIG. 8 is a view showing a flow of information which is exchanged among a prefetching program 160 related to prefetching processing and other programs in the first embodiment.

FIG. 8 is a view showing the prefetching program 160 relevant to the prefetching processing and other programs and a flow of information exchanged among these programs in this embodiment. The prefetching program 160 includes, as functional modules, an SQL analysis module 252, a prefetching method determination module 254, a prefetching instruction module 256 and an information acquisition module 258. Here, the functional modules means sub programs, routines or the like which are provided for some specific processing in one program.

Further, the prefetching program 160 includes system information 300 and SQL analyzing information 280 as processing information. The system information 300 and the SQL analyzing information 280 are held on the memory 14 of the device in which arbitrary prefetching programs 160*a*, 160*b*, 160*a*, 160*d*, 160*e*, 160*f* are executed. A prefetching method 720 is information which is exchanged between the functional modules within the prefetching program 160. Hereinafter, the available information and the manner of using the information will be explained in detail. Further, in the following explanation, numerals described in FIG. 8 will be used.

Figure 9:
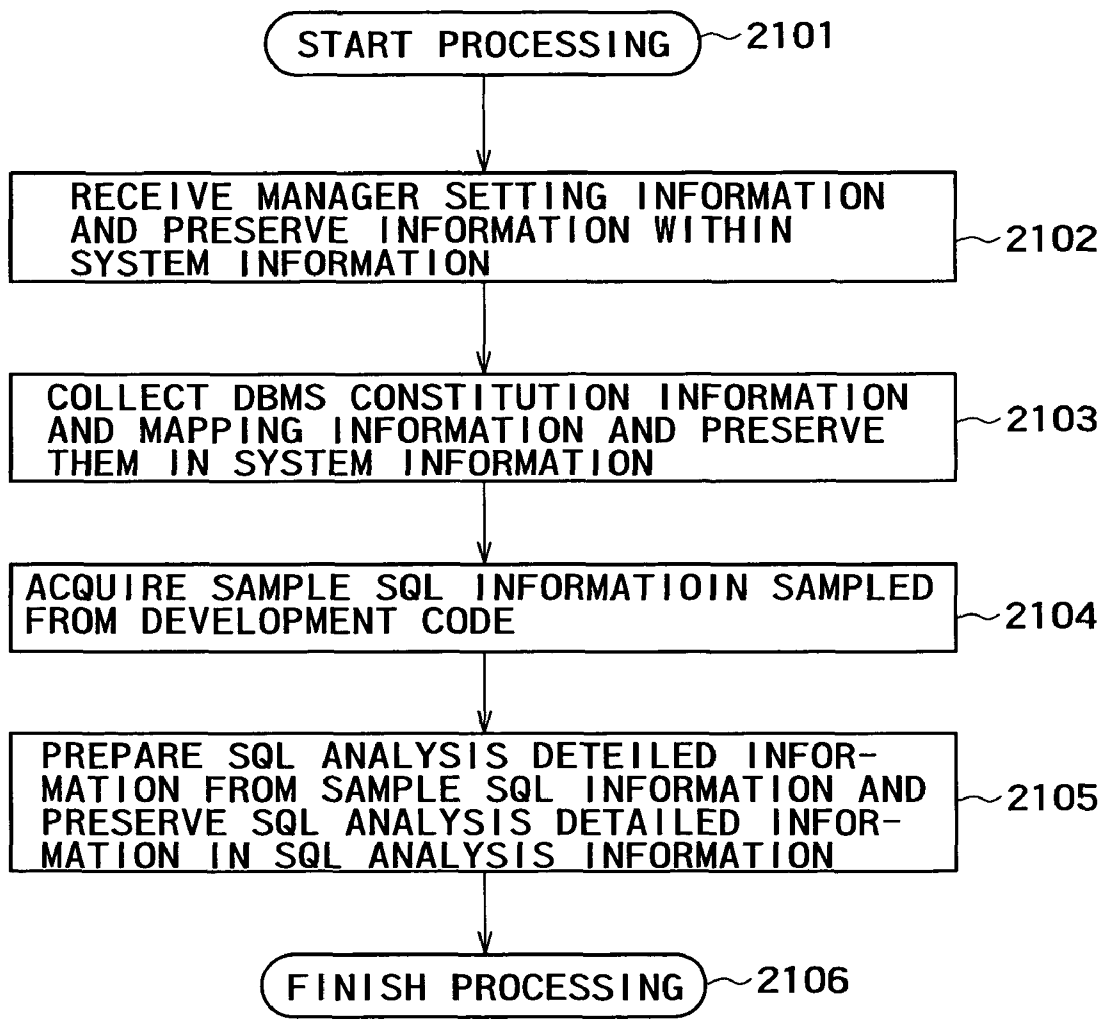
FIG. 9 is a view showing procedure of information collecting processing which the prefetching program 160 executes in advance in the first embodiment.

FIG. 9 is a view showing the procedure of information collecting processing which the prefetching program 160 executes in advance. Here, it is assumed that before executing this processing, with respect to the DB used by the Job program 100 which issues a prefetching instruction to the prefetching program 160, the definition of the DB is completed and the data are actually present (Step 2101).

First, the information acquisition module 258 of the prefetching program 160 receives the prefetching Job information 350 which is the information relevant to the Job program 100 which issues the prefetching instruction and the DB which the Job program 100 uses from the manager via the management terminal 110 and stores the prefetching Job information 350 in the system information 300.

Figure 10:
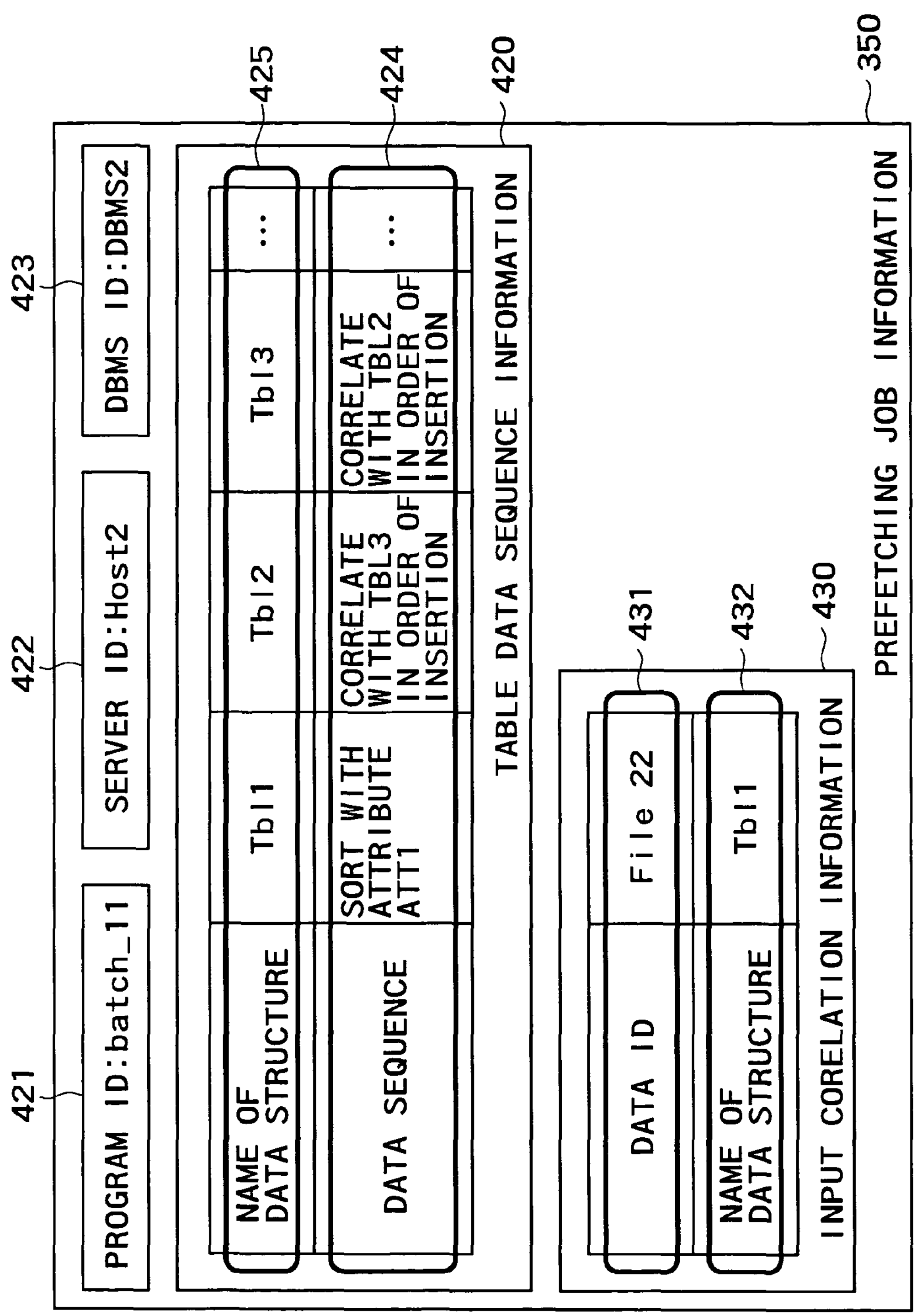
FIG. 10 is a view showing the data structure of the prefetching Job information 350.

FIG. 10 is a view showing the data structure of the prefetching Job information 350. The prefetching Job information 350 includes an entry 421 which holds a program ID of the Job Program 100 as information on the Job program 100 which performs the prefetching instruction. Further, as information of the DB used by the Job program 100, an entry 422 which holds a server ID of the server 70 in which the DBMS 90 for managing the DB is executed, an entry 423 which holds the DBMS ID of the DBMS 90, an entry 420 which registers information on table data order, and an entry 430 which registers input correlation information. Here, the entries 420 and 430 may not be included in the Job information 350.

Further, this drawing shows a case in which the Job program 100 uses only the data of the DB managed by one DBMS 90. When the Job program 100 uses the data of the DB which is managed by a plurality of DBMS 90, the entry 422 and 423 are held as a set in the prefetching Job information 350. Further, to the entries 420 and 430, an entry which holds the DBMS ID corresponding to the data structure name is added.

The table data order information is information which is relevant to the data order of the data used by the Job program 100 as viewed from the DBMS 90. The entry 420 includes a set of entries consisting of an entry 425 which holds the data structure names of the data (table) to be used and an entry 424 which holds the data order which is information regarding how to arrange the data. Here, the entry 424 registers information such as "sorted by a certain attribute of the table" or "stored in order of insert processing" or the like.

The input correlation information is information which indicates that the input data into the Job program 100 are sorted in the same order as the data order of the specific data structure. The entry 430 includes a set of entries consisting of an entry 431 which registers the data ID of the input data and an entry 432 which registers the data structure name having the same order as the input data (Step 2102).

Subsequently, the information acquisition module 258 collects data information to be accessed and information with respect to mapping of the data. First, based on the DBMS 90 which are identified by the DBMS ID indicated in the prefetching Job information 350 which are acquired in Step 2101, the information acquisition module 258 acquires DBMS constitution information 500 which is constituted of data storage area information 510, table data amount information 520, index information 530 and stores the DBMS constitution information 500 in the system information 300 together with the DBMS ID.

Then, the information acquisition module 258 acquires the area mapping information 310 which the file system 80 and the volume manager 78 of the server 70 in which the DBMS 90 corresponding to the DBMS-ID is executed hold in the OS management information 72, and stores the area mapping information 310 in the system information 300 together with the identifier with which the management origin can be identified. Further, the information acquisition module 258 discriminates the area mapping information 310 which are acquired sequentially and acquires the area mapping information 310 from the virtualization switch 60 or the storage device 40 which provide the corresponding storage area and stores the area mapping information 310 in the system information 300 together with the identifier with which the management origin can be identified.

Subsequently, the SQL analyzing module 252 acquires sample SQL information 820 which is information relevant to the SQL statements issued by the Job program 100 which is specified by the prefetching information 350 from the development program 150. The sample SQL information 820 is prepared by the SQL statement sampling module 270 in the development program 150 based on the development code 152 and is constituted of a program ID and the SQL information of the corresponding Job program 100.

Further, the manager may execute the processing which requests the development program 150 to prepare the sample SQL information 820 by designating the program ID and provides the sample SQL information 820 to the prefetching program 160. Alternatively, the SQL analyzing module 252 in the prefetching program 160 may directly execute the processing.

The SQL statement sampling module 270 performs the following processing based on the source code of the program included in the development code 152 corresponding to the program which is identified by the given program ID.

FIG. 11 is a view showing an example of the sample processing in which an embedded SQL statement is included in the source code written in C language as a processing example of the SQL statement sampling module 270 according to this embodiment. In an area indicated by a range 5002 of the source code, the repetition processing is performed using the "for" statement and some SQL statements are executed during the repetition processing. The SQL statement sampling module 270 identifies the repeated structure, determines that the SQL statement is executed repeatedly because the SQL is present in the repeated structure, and prepares information 5000 as SQL information corresponding to the SQL statement. The information 5000 includes information 5012 which shows the start of repetition, information 5010 which samples the embedded SQL statement executed repeatedly in the range 5002 and information 5018 which indicates the end of repetition.

Further, in the information 5012, information 5014 for identifying the respective repetition processing is added following an indicator called "LABEL". With respect to other portions of the source code, in the same manner, a repeated syntax and an SQL statement which is present in the repeated syntax are discriminated from each other and SQL information similar to the information 5000 is prepared.

Figure 12:
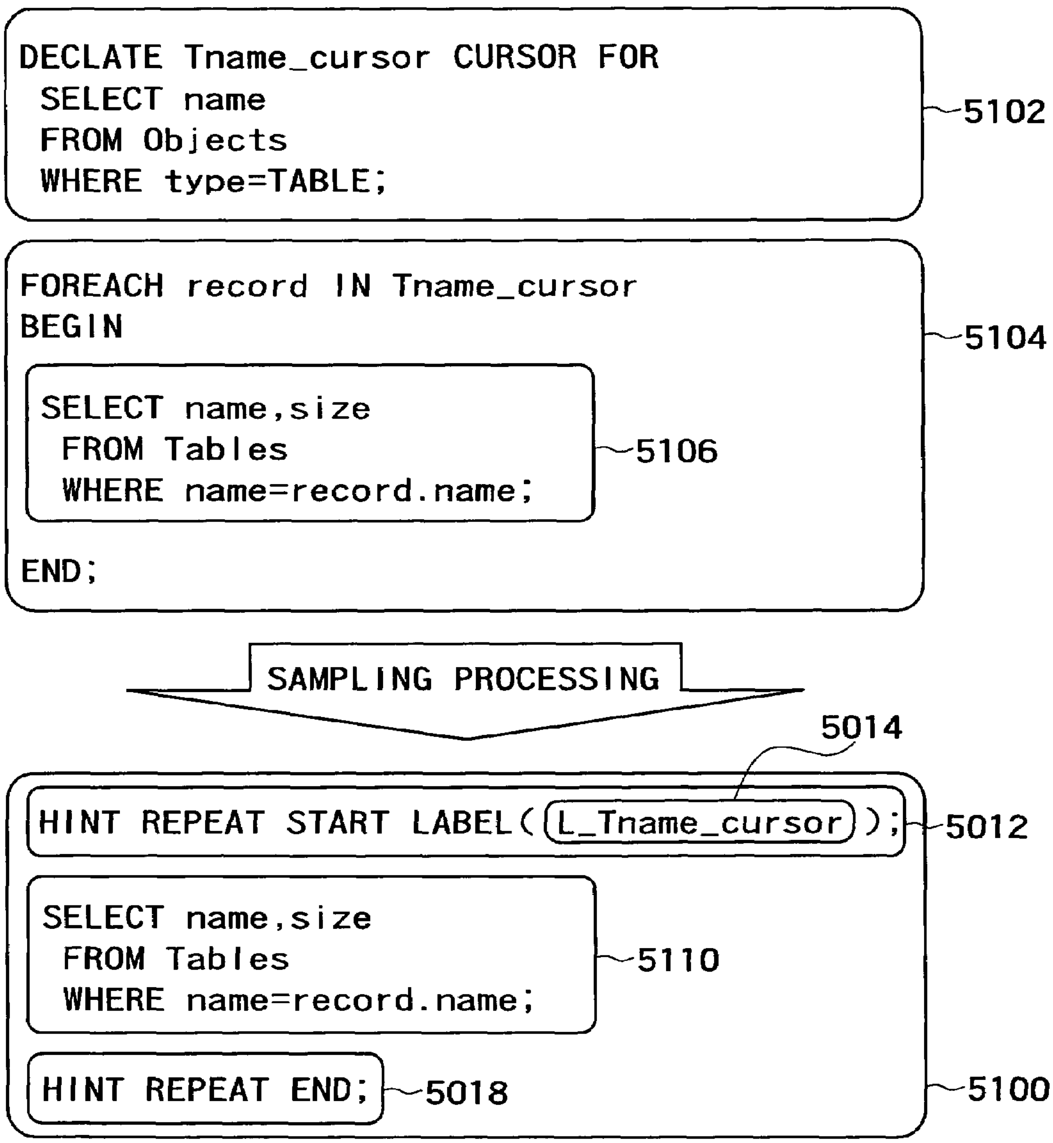
FIG. 12 is a view showing an example of sampling processing in the first embodiment.

FIG. 12 is a view showing an example of the sample processing in which the source code is described in SQL script as a processing example of the SQL statement sampling module 270 according to this embodiment. In this example, a cursor is defined in a range 5102 and the processing in a range 5106 is repeatedly executed for each data read out using the cursor in the range 5104. The SQL statement sampling module 270 discriminates the repeated structure of the range 5104 and prepares information 5100 as the corresponding SQL information. The information 5100 includes information 5012 which shows the start of repetition, information 5110 which is sampled from the SQL statement which are actually executed repeatedly in the range 5014 and the information 5018 which indicates the end of repetition.

Even when an SQL statement sampling module 270 having the data structure showing a unique processing flow is used, the SQL statement sampling module 270 grasps the repeated structure of the processing and prepares similar SQL information.

Further, in the SQL statement sampling module 270, when the repeated structures are formed in a telescopic manner, only the outermost structure is grasped as the repeated structure. Further, when a plurality of independent repeated structures are present, the SQL information corresponding to the repeated structures are prepared in order of execution. Further, also with respect to the SQL statement outside of the repeated structure, the SQL information may be prepared in the same manner as in the case of the SQL statement is within the repeated structure by explicitly showing the area which indicates the start and the end of repetition in the same manner as the information 5012, 5018.

Further, the information 5014 for identifying the repetition processing can be used as an identifier which determines the repetition times at the time of executing the program. Accordingly, when necessary, the development program 150 or the manager may renew the information 5014 included in the sample SQL information 820 to the data ID of the data which drives the repetition processing identified by the information 5014. (Step 2104)

Subsequently, the SQL analyzing module 252 prepares the SQL analyzing detailed information 290 by executing the processing starting from the step 2501 from the acquired sample SQL information 820 and stores the SQL analyzing detailed information 290 in the SQL analyzing information 280 (step 2105). Thereafter, the processing is finished (step 2106).

Figure 13:
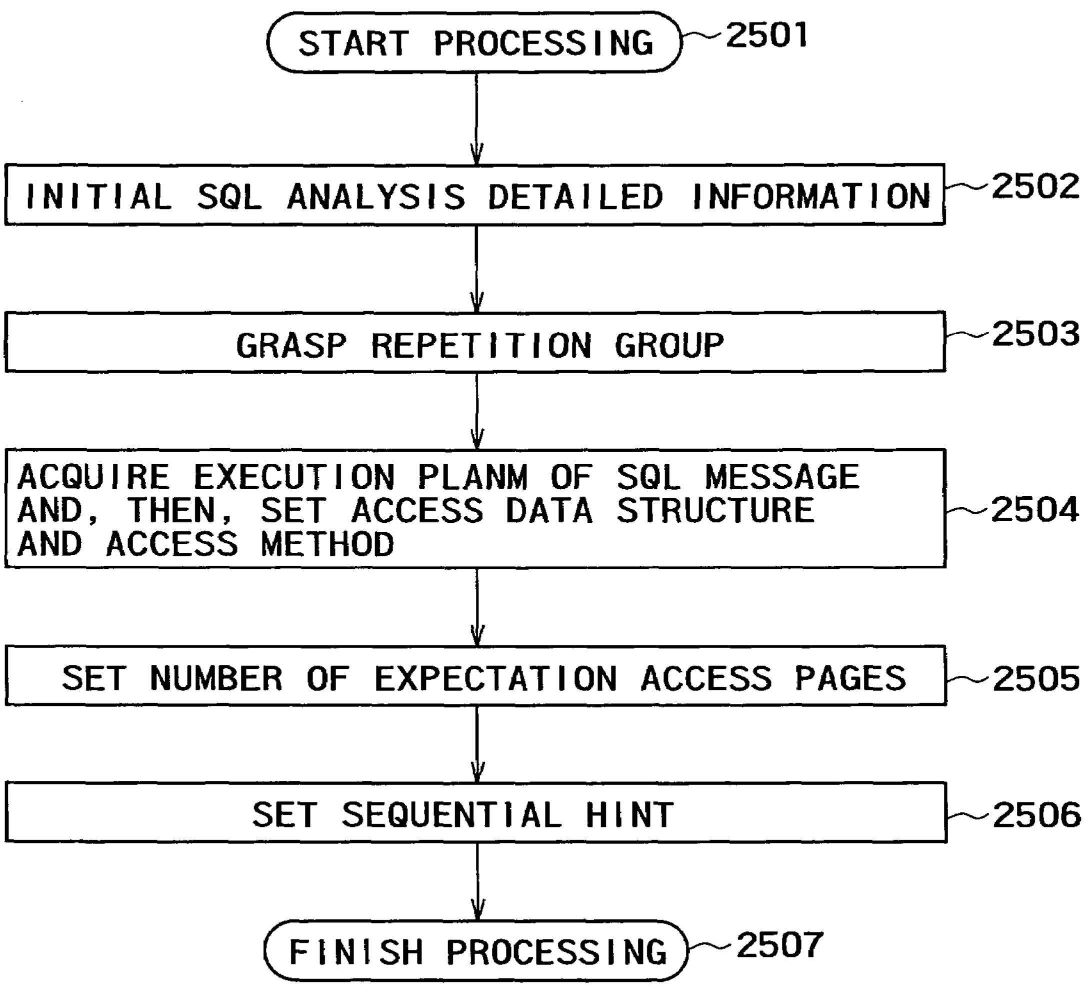
FIG. 13 is a view showing the procedure of processing for preparing SQL analysis detailed information 290 from sampled SQL information 820.

FIG. 13 is a view showing steps of processing for preparing the SQL analyzing detailed information 290 from the sample SQL information 820 using the SQL analyzing module 252. First, at the time of starting the processing, the sample SQL information 820 corresponding to the prefetching Job information 350 is given to the SQL analyzing module 252 (step 2501).

Figure 14:
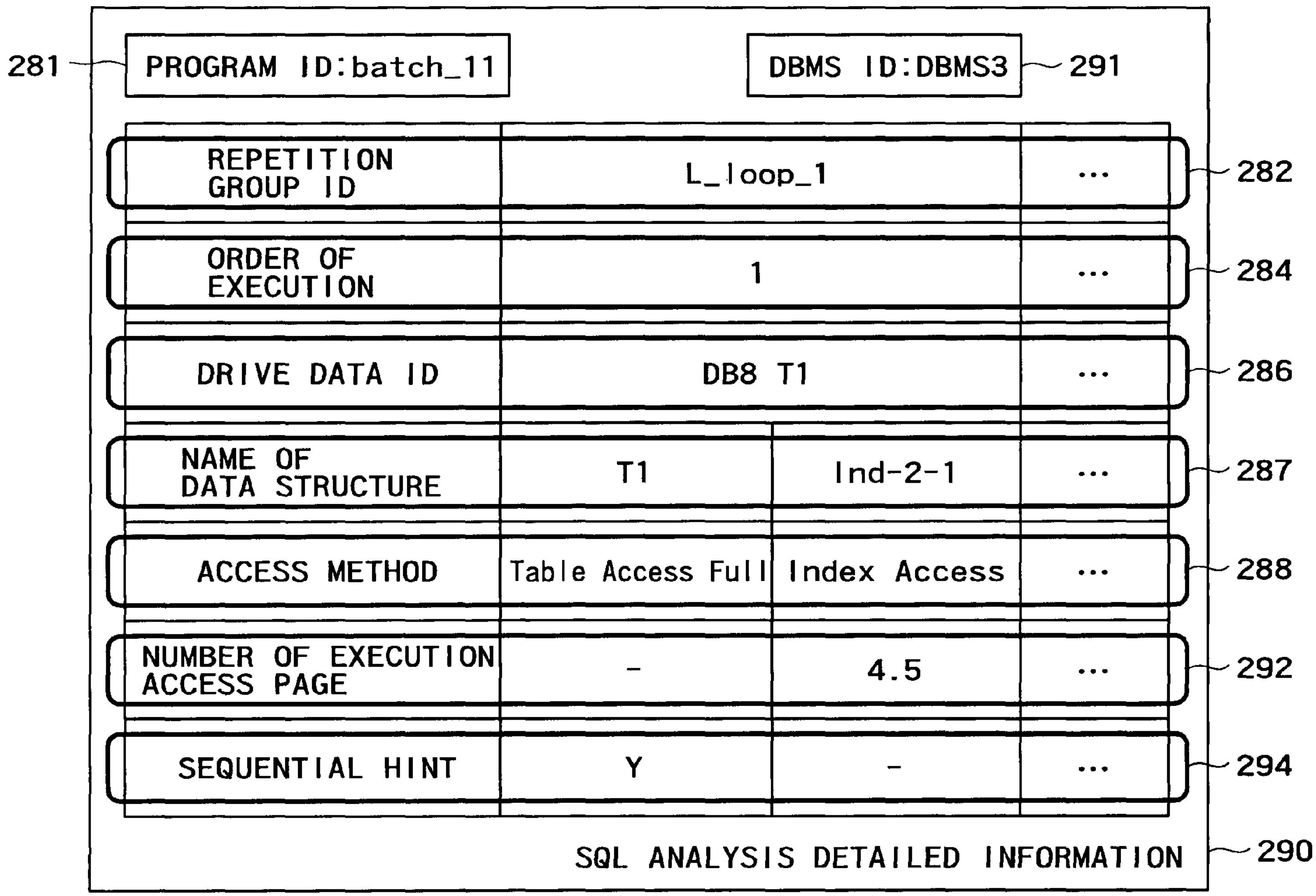
FIG. 14 is a view showing the data structure of the SQL analysis detailed information 290.

The SQL analyzing module to which the sample SQL information 820 is given initializes the SQL analyzing detailed information 290. FIG. 14 is a view showing the data structure of the SQL analyzing detailed information 290. The SQL analyzing detailed information 290 includes a set of entries consisting of an entry 281 which holds a program ID which constitutes an identifier of the corresponding Job program 100, an entry 291 which holds a DBMS ID of the DBMS 90 managing the DB used by the processing, an entry 282 which holds repeated group IDs which constitutes a group identifier of the SQL statement which is executed repeatedly, an entry 284 which holds the execution order indicating the order of execution of the processing among the group, an entry 286 which holds driving data IDs which constitute data IDs of the data driving the repetition processing, an entry 287 which holds data structure names of data to be accessed, an entry 288 which holds an access method showing the manner of getting access to the data, an entry 292 which holds expected access page number indicating the number of the data pages which is expected to be accessed in one processing when a method which executes random access is designated as the access method, and an entry 294 which holds a sequential hint whose value is set to “Y” when the sequential access is expected.

Further, the drawing shows the case in which the Job program 100 uses only the data of the DB managed by one DBMS 90. When the Job program 100 uses the data of the DB which is managed by a plurality of DBMS 90, the SQL analyzing detailed information 290 does not hold only one entry which holds the DBMS ID as a whole but holds a set of the DBMS ID and the data structure name.

The SQL analyzing module 252 initializes the SQL analyzing detailed information 290 by setting the program ID in the entry 281 and by clearing the entries which hold other data (step 2502).

Next, the SQL analyzing module 252 grasps the repeated group from the SQL information of the sample SQL information 820. The repeated group is grasped as a portion surrounded by the information 5012 indicating the start of repetition and the information 5018 indicating the end of repetition corresponding to the start of repetition.

Further, there is a possibility that the repeated groups are present in a plural number. In this case, however, a plurality of groups is arranged in order of steps to be executed. Accordingly, the SQL analyzing module 252 adds the repeated group IDs as independent identifiers to the respective groups, sets the execution order in order of the appearance of the groups and registers the respective groups in the entries 282, 284. Further, the SQL analyzing module 252 also sets a label indicated by the information 5014 as a driving data ID in the entry 286. Further, when information that the groups are out of the repeated structure in the SQL information of the sample SQL information 820 in a similar style as the information 5012, 5018, these groups may be also set as the repeated groups (step 2503).

Thereafter, among the respective repeated groups, the SQL analyzing module 252 gives the SQL statement which is present in a portion sandwiched by the information 5014 which indicates the start of repetition and information 5018 which indicates the end of repetition and is executed in the repeated group to the DBMS 90 corresponding to this processing and acquires an execution plan 570 from the DBMS 90.

FIG. 15 is a view showing the data structure of the execution plan 570 which the SQL analyzing module 252 acquires in this embodiment. The content of the execution plan 570 is divided into some detailed processing steps and expressed by a tree structure having the divided processing steps as individual nodes. In this tree structure, the dependent relationships of the data used for the processing performed in the individual processing steps constitute branches and the earlier the processing is executed, the processing is positioned closer to a distal end of the tree structure. Further, when a plurality of data are used in a node, the node holds a plurality of branches.

The execution plan 580 holds a set of entries consisting of an entry 572 which holds node names of the nodes indicative of respective processing steps, an entry 574 which holds a node name of the parent node of the node, an entry 576 which holds contents of processing performed in the nodes, an entry 578 which holds the data structure name of the data which is the destination of the access when the data is accessed using the node, and an entry 582 which holds the condition or the like of the selection processing executed at the node.

As the processing executed at the node, total scanning of the table data, an access to the index, an access to the table using an index reference result, data selection processing, calculation such as joining/sorting/summing up or the like and information indicative of these processing is held in the entry 576. For example, when the node is a node which executes a hash join calculation, branches corresponding to the data used in a build phase and the data used in a probe phase are present. Here, the node names are added such that there exists the size relationship in the nodes and the information is held using this size relationship.

The SQL analyzing module 252 grasps the data structure which can be accessed using the SQL statement 700 in the repeated group and the access method based on the contents of the node processing and the access data structure name which are registered in the entries 576 and 578 in the acquired execution plan 570 and sets information of the data structure names and the access method in the corresponding entries 287 and 288 in the SQL analyzing detailed information 290. The SQL analyzing module 252 executes these processing with respect to all repeated groups which are grasped in the step 2503 (step 2504).

Further, the SQL analyzing module 252, in the data structure to be accessed which is grasped in the step 2504, with respect to a B-Tree index or table data to be accessed using the B-Tree index, sets the expected access page number to the corresponding entry 292 in the SQL analyzing detailed information 290.

To be more specific, based on the execution plan 570, the SQL analyzing module 252 grasps the nodes which are positioned at leafs of the tree structure expressing the processing steps and perform processing to get access to the B-Tree index and refers to the entry 582 of the node thereof and requests the retrieval condition of the node. First of all, with respect to the value to be selected which is not the result of other processing but is designated univocally by the SQL statement 700, the SQL analyzing module 252 refers to the entry 542 of the index information 530 which is preserved in the system information 300 and requires the expected tuple number at such a retrieval condition. The value is the expected tuple number of data to be accessed using the index. Further, the expected tuple number of data as the base of the index access is defined as 1.

Thereafter, the SQL analyzing module 252, again, checks the retrieval condition in the node which performs the processing to access the B-Tree index. Then, in performing the retrieval processing using the data in which the expected tuple number to be accessed has been acquired, the SQL analyzing module 252 acquires the expected tuple number for retrieval per driving data 1 tuple from the entry 542 of the index information 530. The product of the expected tuple number of the data driving the index reference and the expected tuple number acquired by index reference result becomes the accessed expected tuple number of the data which is accessed using the index. Hereinafter, this check is repeatedly performed.

After acquiring the expected tuple number of the data which is accessed by the retrieval processing using the B-Tree index by the above-mentioned method within a possible range, the SQL analyzing module 252 regards that, basically, each tuple is present in the different data page and acquires the data page number to be accessed. However, it may be possible that the information on how the tuple which is retrieved by a certain B-Tree index is dispersed in data pages is included in the index information 530 and, the data page number to be accessed may be acquired in detail using the information.

As a whole or a part of the processing, the SQL analyzing module 252 may output the value which is internally estimated when the executing plan 570 is prepared by the DBMS 90 together with the execution plan 570 and may use the value. The acquired value is set to the corresponding entry 292. The SQL analyzing module 252 executes these processing with respect to all repeated groups which have been grasped in the step 2503 (step 2505).

Finally, the SQL analyzing module 252 performs setting of a sequential hint. First, the SQL analyzing module 252 refers to the entry 288 in the SQL analyzing detailed information and sets the value of the entry 294 of the sequential hint whose methods correspond to "total scanning", "access to Bit Map index" and "access to the table using Bit Map index" to "Y". Then, the SQL analyzing module 252 refers to the entry 430 of the input correlation information in the prefetching Job information 350 and sets the value of the entry 294 of the sequential hint corresponding to the entry whose data ID registered therein agrees with the driving data ID registered in the entry 286 and the data structure name agrees with the data structure name to "Y".

Thereafter, the SQL analyzing module 252 grasps whether the data by which nest loop coupling is performed using the data with which "Y" is set as the driving data in the entry 294 of the sequential hint is present based on the already acquired executing plan 570. When such data is present, the SQL analyzing module 252 refers to the entry 420 of the table data order information of the prefetching Job information 350, checks the data orders of the driving data and the coupling data and, when the data orders are substantially equal to each other, the value of the entry 294 of the corresponding sequential hint is set to "Y" also with respect to the coupled data (step 2506). Thereafter, the SQL analyzing module 252 completes the processing (step 2507).

Due to the above-mentioned processing, the preliminary information collection processing is executed.

Hereinafter, the prefetching instruction processing by the prefetching program 160 when the Job program 100 is executed is explained.

Figure 16:
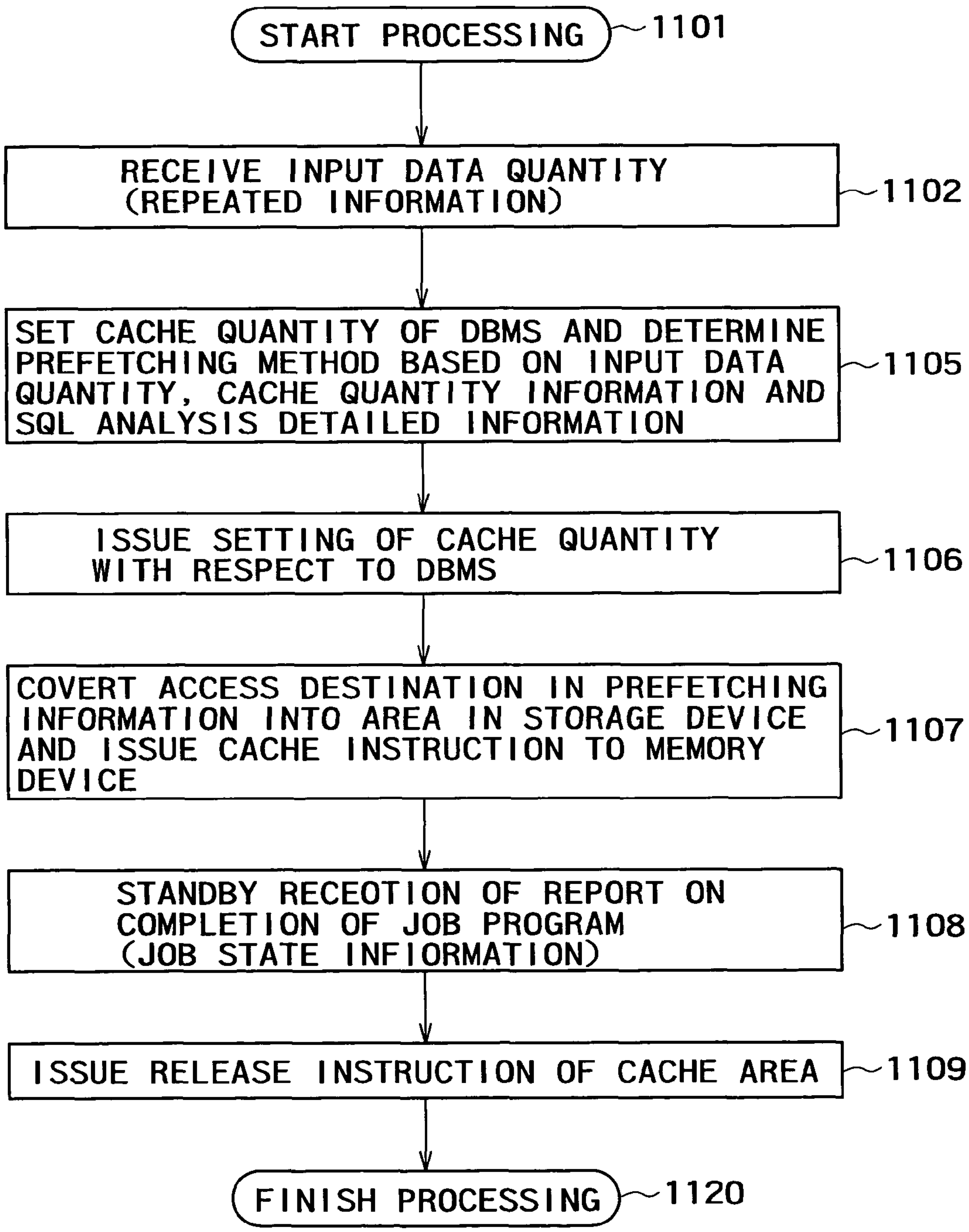
FIG. 16 is a view showing the procedure of prefetching instruction processing by the prefetching program 160 in the first embodiment.

FIG. 16 is a view showing the processing steps of the prefetching instruction processing. In this processing, the prefetching method decision module 254 starts by receiving the start of the Job program 100 as the Job state information 800 from the Job management program 130. Upon reception of the completion of the Job program 100 as the Job state information 800, a post processing is executed and the processing is completed. Further, the Job state information 800 is transmitted together with the program ID which constitutes an identifier of the Job program 100 whose condition is always indicated. Further, the Job state information 800 indicative of the start of the Job program 100 includes the cache amount information when necessary (step 1101).

Next, the prefetching method decision module 254 receives an input data amount as the repetition information 805 from the Job management program 130. This input data amount is the number of data which are given as inputs to the Job program 100 and are given as a set of data consisting of data ID of the input data and data expressing the number of the data. In this embodiment, the input data uses output data of the other Job program 100 which is executed before the Job program 100 which will be executed from now. The Job program 100 which was executed previously is made to output the number to the Job management program 130 as a data amount 810. The Job management program 130 calculates the number of data of the Job program 100 which will be executed from now based on the value and gives the number as the input data amount of a repetition information 805. Further, it is not always necessary to execute this step (step 1102).

Next, the prefetching method decision module 254 determines the cache amount setting 710 and the prefetching method 720 to be instructed to the DBMS 90 based on the input data amount which is acquired in step 1102, the cache amount information in the Job state information 800 and the SQL analyzing detailed information 290 in the SQL analyzing information 280.

FIG. 17 is a view showing the data structure of the cache amount setting 710 which the prefetching method decision module 254 instructs to the DBMS 90. The cache amount setting 710 includes a set of entries consisting of an entry 711 which holds data structure names of the data structure to which the cache amount setting is instructed and an entry 712 which holds the cache amounts which must be used at a minimum level. When a plurality of DBMSs 90 are concerned, the prefetching method decision module 254 provides these entries for every DBMS 90.

FIG. 18 is a view showing the data structure of the prefetching method 720 which is used in the prefetching program 160. The prefetching method 720 includes a set of entries consisting of an entry 721 which holds data structure names of the data structures which perform the prefetching or the cache instruction, an entry 722 which holds the prefetching method/cache method, an entry 723 which registers the device ID of the corresponding storage device 40, an entry 724 to which a cache amount indicating an allocation amount of the data cache 42 to be used in the storage device 40 is registered, and an entry 725 which holds the access order to the data. Further, when a plurality of DBMSs 90 are concerned, an entry which holds the DBMS IDs is further added to the prefetching method 720.

First of all, the prefetching method decision module 254, selects the SQL analyzing detailed information 290 corresponding to the program ID given at the start of the processing from the SQL analyzing information 280. In the SQL analyzing detailed information 290, for the data structure whose access method registered in the entry 288 is "total scanning", to both of the storage device 40 and the DBMS 90, given amounts of caches which are determined respectively independently in advance for the "total scanning" access are allocated. Next, for the data structure whose access method registered in the entry 288 is not "total scanning" and the value of the entry 292 of the sequential hint is "Y", the prefetching method decision module 254 allocates the cache amount which is specified respectively independently and is larger than the cache amount in the case of total scanning to both of the storage device 40 and the DBMS 90. Then, the prefetching method decision module 254 registers "sequential" in the entry 722 with respect to these data structures.

With respect to data structures other than the above-mentioned data structure, the prefetching method decision module 254, firstly, in order to assure the execution of processing, allocates the minimum cache amounts which are preliminarily determined to both of the storage device 40 and the DBMS 90 and distributes remaining cache to these data structures in the following manner.

With respect to all driving data IDs, in the step 1102, when the input data amount having the data IDs which agrees with the driving data IDs is given and the value is held in the entry 292 of the corresponding expected access page number in all data structures to which the cache amount should be determined from now, using (the input data amount corresponding to the driving data ID)×(the expected access page number)/(the data page number of the data structure) as a pointer, in order from the data structure having the larger value, the amount corresponding to either (the input data amount corresponding to the driving data ID)×(the expected access page number)×(the data page size) ×(previous setting ratio) or (the data page number of the data structure)×(the data page size)×(previous setting ratio) which have smaller value is allocated to the data structure.

Thereafter, the prefetching method decision module 254 repeats until the sum of the allocated cache amounts becomes the value of cache amount given by the entry 340 for every DBMS 90. Thereafter, the prefetching method decision module 254, using the same pointer, consecutively repeats the allocation of the cache to the storage device 40 until the cache becomes the value of the cache amount given in the entry 340 for every storage device 40.

When there exists the data structure in which the above-mentioned condition is not satisfied and the pointer cannot be calculated, the prefetching method decision module 254 performs the processing similar to the above-mentioned processing by using (the data page number of the data structure) as a priority decision pointer of the cache allocation and (the data page number of the data structure)×(the data page size)×(previous setting ratio) as a cache allocated amount. For the data structure to which the cache is allocated to the storage device 40 in these methods, the prefetching method decision module 254 registers "immediate prefetching" in the entry 722.

The information with respect to the data page of the data structure can be acquired by referring to the corresponding entry based on the index information 530 of the system information 300. Further, although it is necessary to acquire the cache amount for every storage device 40, the prefetching method decision module 254 refers to the data storage area information 510 and the area mapping information 310 in the system information 300 and learns the storage device 40 in which the data structure is stored. When a certain data structure is stored in a plurality of storage devices 40, the prefetching method decision module 254, in principle, distributes the cache amount to the storage devices 40 relative to the respective data amounts. However, when the cache amount exceeds the restriction of the cache amount registered in the entry 340 in any of the storage devices 40, the prefetching method decision module 254, after allocating the cache amount to the storage device 40 to the restricted cache amount, distributes the cache amounts proportional to the respective data amounts between the remaining storage devices 40.

According to the cache allocation acquired by the above-mentioned method, the prefetching method decision module 254 sets a value in the cache amount setting 710 and the prefetching method 720. Further, in the entry 725 in the prefetching method 720, the corresponding values in the SQL analyzing detailed information 290 are set directly.

Further, the cache amount information 340 is not always given. In this case, the prefetching method decision module 254 determines that the available cache amounts in the DBMS 90 or the storage device 40 are preliminarily-set allocated portions of the respective total cache amounts.

Further, although the explanation is made such that the prefetching method decision module 254 sets the cache amounts of both of the DBMS 90 and the storage device 40, it is possible that the cache amount of the DBMS 90 is fixed and the allocation may be changed dynamically with respect to only cache amount of the storage device 40. In this case, the prefetching method decision module 254, using the same index as the index which is used when the cache allocation is performed with respect to the above-mentioned DBMS 90, acquires the cache allocating priority and the cache allocating amount to the data structure. Then, the prefetching method decision module 254, in descending order of priority of the data structure, performs the allocation of the cache of the storage device 40 to the shortage of the minimum available cache amount in the data structure of the present DBMS 90 from the acquired cache allocation amount by using the cache of the storage device 40. The prefetching method decision module 254 repeats the above-mentioned processing until the cache amount which can be allocated becomes 0 in the storage device 40 (step 1105).

The prefetching method decision module 254 instructs the cache amount setting 710 which is acquired in the step 1105 to the corresponding DBMS 90. Further, the prefetching method decision module 254, before providing the instruction to the DBMS 90, acquires the cache amount setting before setting of the DBMS 90 and stored the setting separately. Based on this instruction (adding own judgement when necessary), the DBMS 90 changes the setting of the cache amount. Further, when the cache amount of the DBMS 90 is fixed and hence unchanged, this step is not executed (step 1106).

Next, the prefetching method decision module 254 provides the prefetching method 720 acquired in the step 1105 to the prefetching instruction module 256 and requests the storage device 40 to issue the cache instruction 730.

FIG. 19 is a view showing the data structure of the cache instruction 730. The cache instruction 730 includes a set of entries consisting of an entry 732 which holds grouping which is an identifier for putting together a plurality of areas into one, an entry 734 which holds data areas consisting of identifiers of the virtual structures such as LU or the like indicating the data area in the storage device 40 and the information indicating the area, an entry 735 which holds cache means, an entry 736 which holds cache amounts and an entry 737 which holds the access order.

The prefetching instruction module 256 which receives the request discriminates the data areas in the respective storage devices 40 based on the data structure names and the device ID of the prefetching method 720 using the data storage area information 510 and the area mapping information 310 in the system information 300 and prepares the cache instruction 730 for every storage device 40. Here, with respect to the entries 735, 736 and 737, the values which correspond to the cache method registered in the prefetching method 720, the cache amount and the access order are directly set. With respect to the grouping, although the group corresponds to a set having the same data structure name and the device ID, on the storage device, the same value is set when the group is divided into the noncontiguous data areas and different values are set in other cases.

Thereafter, the prefetching instruction module 256 sends the prepared cache instruction 730 to the corresponding storage device 40. The control program 44 of the storage device 40 which receives the cache instruction 730 executes the management and the prefetching processing of the data cache 42 in accordance with the instruction.

Further, the prefetching method decision module 254 separately stores the prefetching method 720 which the prefetching method decision module 254 requests the prefetching instruction module 256 (step 1107).

Thereafter, the prefetching method decision module 254 temporarily stops the processing until the prefetching method decision module 254 receives the completion report of the Job program 100 as the Job state information 800 from the Job management program 130 (step 1108).

After receiving the completion report of the processing as the Job state information 800, the prefetching method decision module 254 issues the releasing instruction of setting of set cache to the DBMS 90 or the storage device 40. To be more specific, when the prefetching method decision module 254 instructs the change of the cache amount to the DBMS 90 in the step 1106, the prefetching method decision module 254 sends the cache amount setting 710 for restoring the cache amount to the cache setting before instruction preserved in the step to the DBMS 90. Based on this instruction, the DBMS 90 restores the cache amount setting to the original value.

Further, the prefetching method decision module 254, with respect to the prefetching instruction module 256, sets all entry 722 in the stored prefetching information 720 to "setting release", sends the prefetching information 720 which sets all the value of entry 724 to 0, and requests the prefetching instruction module 256 to issue the cache instruction 730. The prefetching instruction module 256, based on the given prefetching information 720, issues the cache instruction 730 to the corresponding storage device 40 in the same manner as the step 1107 and instructs the cache setting release. The control program 44 of the storage device 40 which receives the cache instruction 730, according to the instruction, restores the management of the data cache 42 to the original condition and finishes the data prefetching according to the previously given cache instruction 730 (step 1109).

In this manner, all the processing are completed (step 1120).

Heretofore, the explanation is made such that the storage device 40 provides the LU 208 to the external device and the external device accesses to LU 208 via the I/O pass 34. However, the present invention is applicable to the constitution in which the storage device 40 provides the file 202 to the external device and the file 202 can be accessed using the network file system protocol via the network 24.

Figure 20:
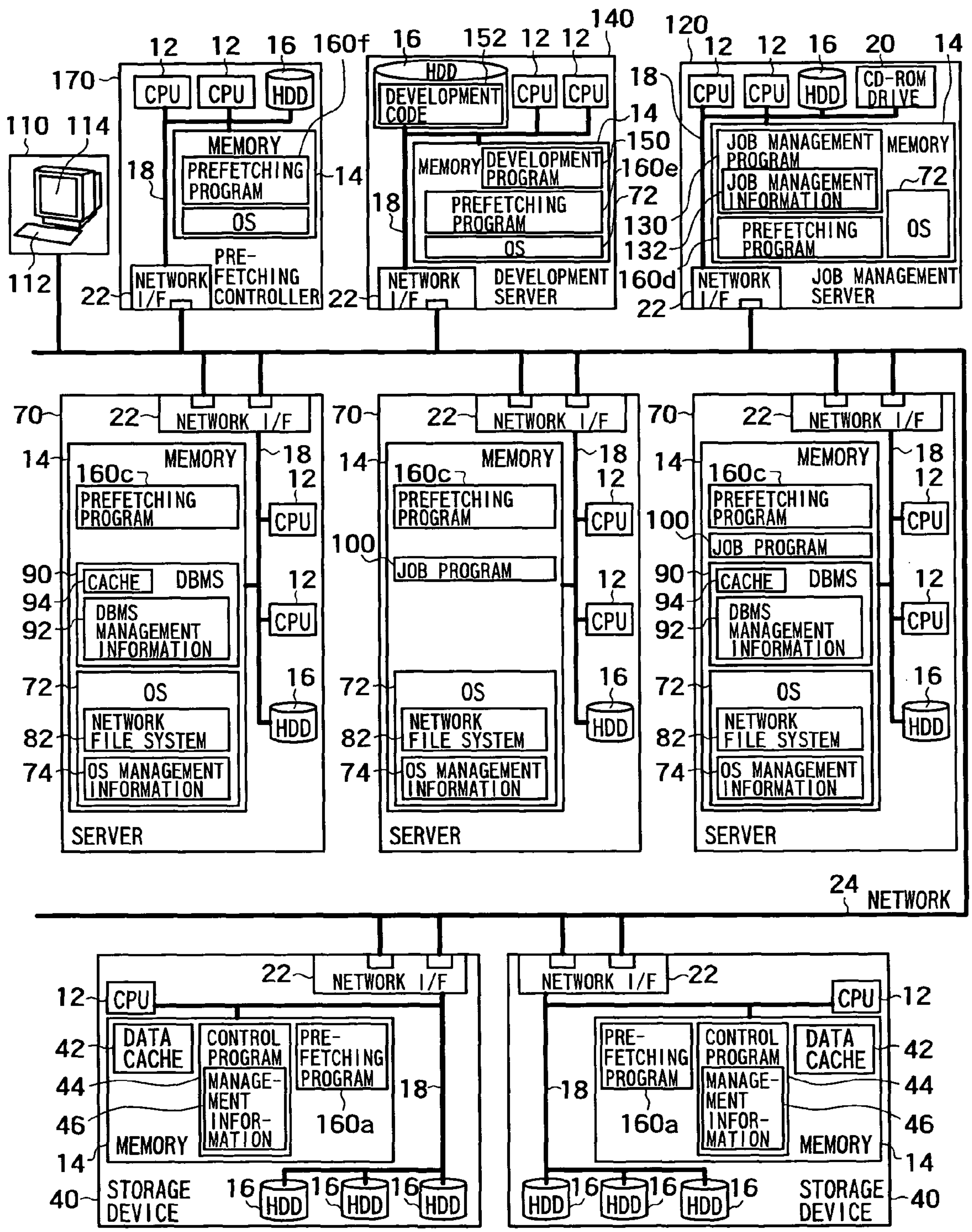
FIG. 20 is a view showing the constitution of a computer system when a storage device 40 provides a file 202 to an external device in the first embodiment.

FIG. 20 is a view showing the constitution of the computer system in which the storage device 40 provides the file 202 to the external device. Here, the computer system shown in the drawing differs in following points compared with the computer system shown in FIG. 1.

Neither I/O pass 34 nor virtualization switch 60 are provided. The server 70 includes no I/O path I/F 32. The OS 72 includes a network file system 82 which accesses the file 202 provided by the external device using a network file system protocol via the network I/F 22 and the network 24 and it is not necessary that the OS 72 includes a volume manager 78 or a file system 80. The network file system 82 includes area mapping information 310 in the OS management information 74. When the file 202 which is recognized by the DBMS 90 and the file 202 which is provided by the storage device 40 correspond to each other in accordance with a given rule, only the information on the rule which defines the relationship therebetween may be held in the OS management information 74. Here, the prefetching program 160 acquires the information which defines the corresponding relationship and then, prepares an area mapping information 310 based on the information which defines the corresponding relationship and stores the area mapping information 310 in the system information 300.

It is not necessary for the storage device 40 to include the I/O path I/F 32 and the storage device 40 provides a file to the external device. The control program 44 of the storage device 40 includes a program equivalent to the program in the file system 80 shown in FIG. 1 and virtualizes the storage area of the LU 208 which exists in the storage device 40 and provides the virtualized memory area as the file 202. Further, the control program 44 interprets one or more network file system protocols and processes the file access which is requested from the external device via the network 24 and the network I/F 22 using the protocol. In this storage device 40, with respect to the cache instruction 730, the file identifier and the information which indicates the area of the identifier are registered in the entry 734 and, based on the file 202, it is possible to instruct the cache area from the outside or the cache method thereof.

With respect to the data mapping, in the mapping hierarchical structure of the data explained with FIG. 2, all of the file 202 and layers below the file 202 are provided by the storage device 40 and the server 70 accesses the file 202 on the storage device 40 using the network file system 82 in the OS 72.

When the storage device 40 provides the file 202 to the external device, in the above-mentioned respective processing, the portion corresponding to the LU 208 is replaced with the file 202 on the storage device 40.

Next, the second embodiment of the present invention is explained. In the second embodiment, at the start of the processing, the prefetching program acquires the SQL statement which is repeatedly executed and issues the prefetching instruction based on the result of analysis. Further, the second embodiment has many parts which are identical to parts of the first embodiment. Hereinafter, only the parts which are different from the parts of the first embodiment are explained and the explanation of the identical parts is omitted. Further, the constitution of the computer system and the data structure of the data which are held by respective devices according to the second embodiment are, in principal, equal to those of the first embodiment except for the following parts.

Figure 21:
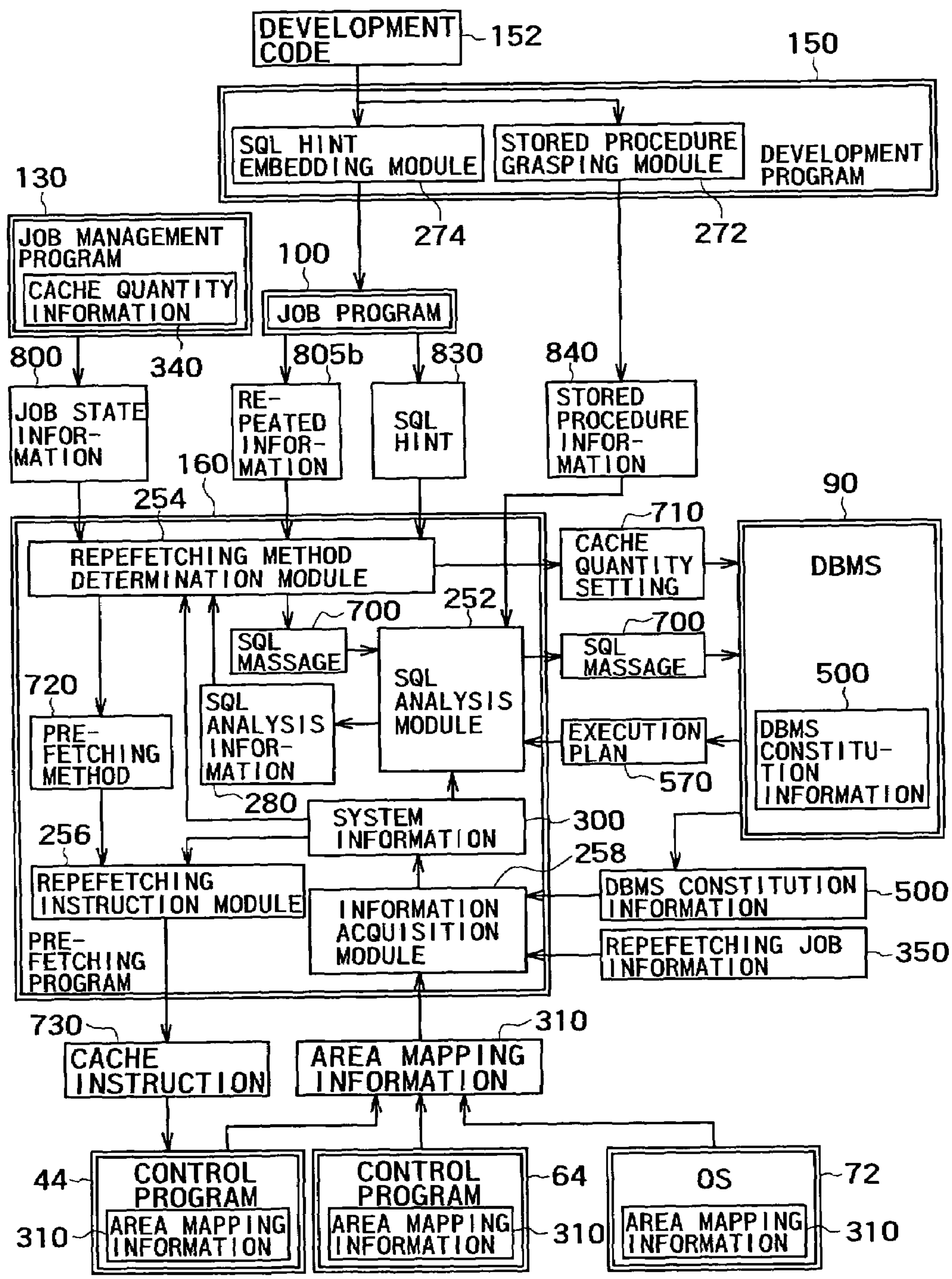
FIG. 21 is a view showing a flow of information which is exchanged among a prefetching program 160 related to prefetching processing and other programs in the second embodiment.

FIG. 21 is a block diagram showing the prefetching program 160 relating the prefetching process, other programs and information which are held by these programs or exchanged among the programs in the second embodiment. Instead of receiving repetition information 805 from the Job management program 130, the prefetching program 160 receives the stored procedure information 840 before execution of the Job program 100 and receives repetition information 805*b* from the Job program 100. Further, instead of acquiring the sample SQL information 820 before the Job program 100 is executed, the prefetching program 160 receives the stored procedure information 840 before executing the Job program 100 and receives an SQL hint 830 from the Job program 100 when the Job program 100 is executed. Further, although the prefetching program 160 receives the Job state information 800 from the Job management program in the drawing, the prefetching program 160 may receive the Job state information 800 from the Job program 100.

Figure 22:
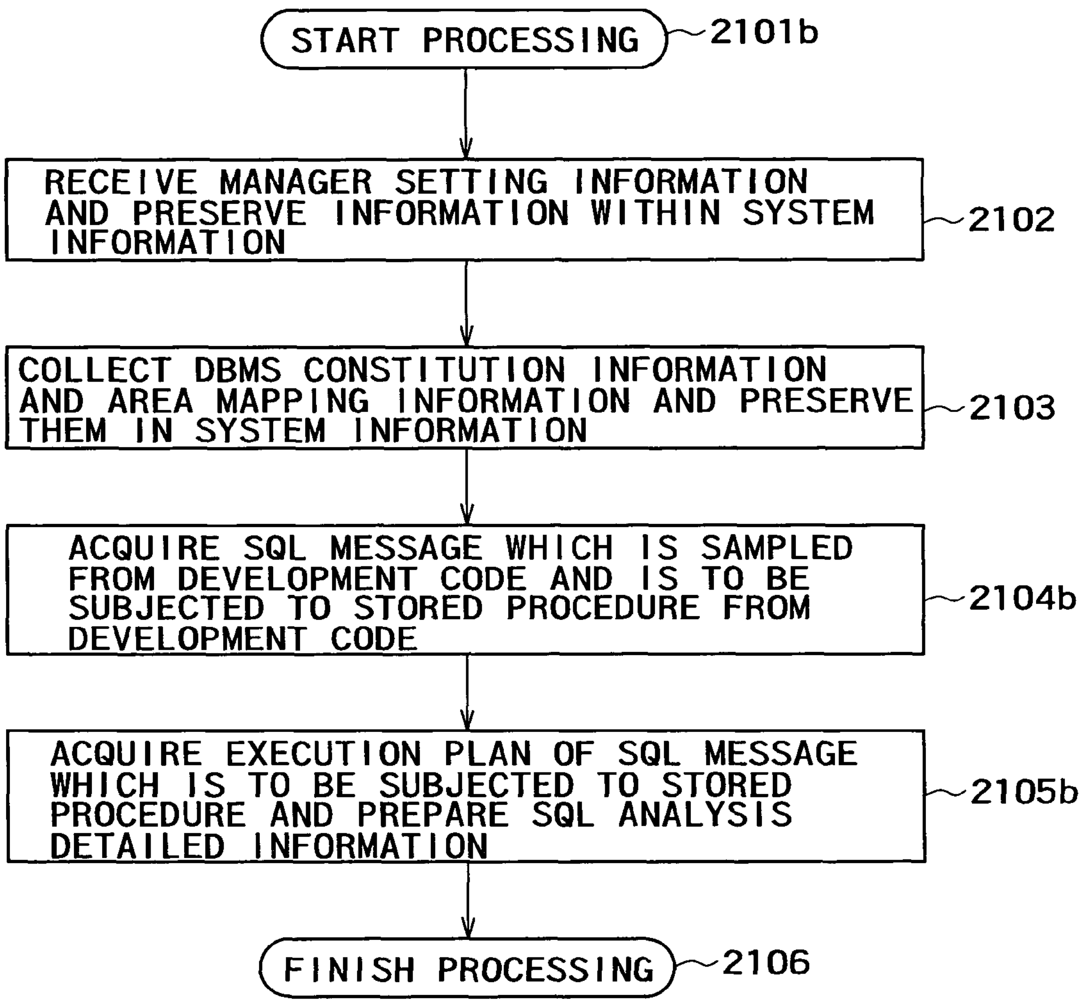
FIG. 22 is a view showing the procedure of information collecting processing which the prefetching program 160 executes in advance in the second embodiment.

FIG. 22 is a view showing the processing steps of the information collection processing which is executed by the prefetching program 160 in advance.

In the step 2102, step 2103 and step 2106, processing which are identical with the processing started from the step 2101 are executed.

Upon completion of processing in the step 2103, among the SQL statements issued by the Job program 100 which are designated by the prefetching Job information 350, the SQL analyzing module 252 acquires the SQL statement which is subjected to stored procedure as stored-procedure information 840.

FIG. 23 shows an example 5200 of the declaration of stored procedure declaration which is included in the stored procedure information 840. In this example 5200, a range 5202 indicates a calling name of the stored procedure. A stored procedure grasping module 272 in the development program 150 generates the stored procedure information 840 based on the development code 152. To be more specific, the stored procedure grasping module 272 generates the stored procedure information 840 by analyzing the SQL statement which is contained in the source code which is, in turn, included in the development code 152, grasping the declaration part of the stored procedure, and sampling such a declaration part.

When a plurality of stored procedures are used, the stored procedure information 840 is generated by sampling all stored procedures. Here, with respect to the processing in which the preparation of the stored procedure information 840 is requested to the development program 150 by designating the program ID and the stored procedure information 840 is given to the prefetching program 160, such processing may be performed by the manager or may be performed directly by the SQL analysis module 252 (step 2104*b*).

The SQL analysis module 252 separates the stored procedures included in the acquired stored procedure information 840 from each other and prepares the SQL analysis detailed information 290*b* with respect to the separated respective stored procedures independently.

Figure 24:
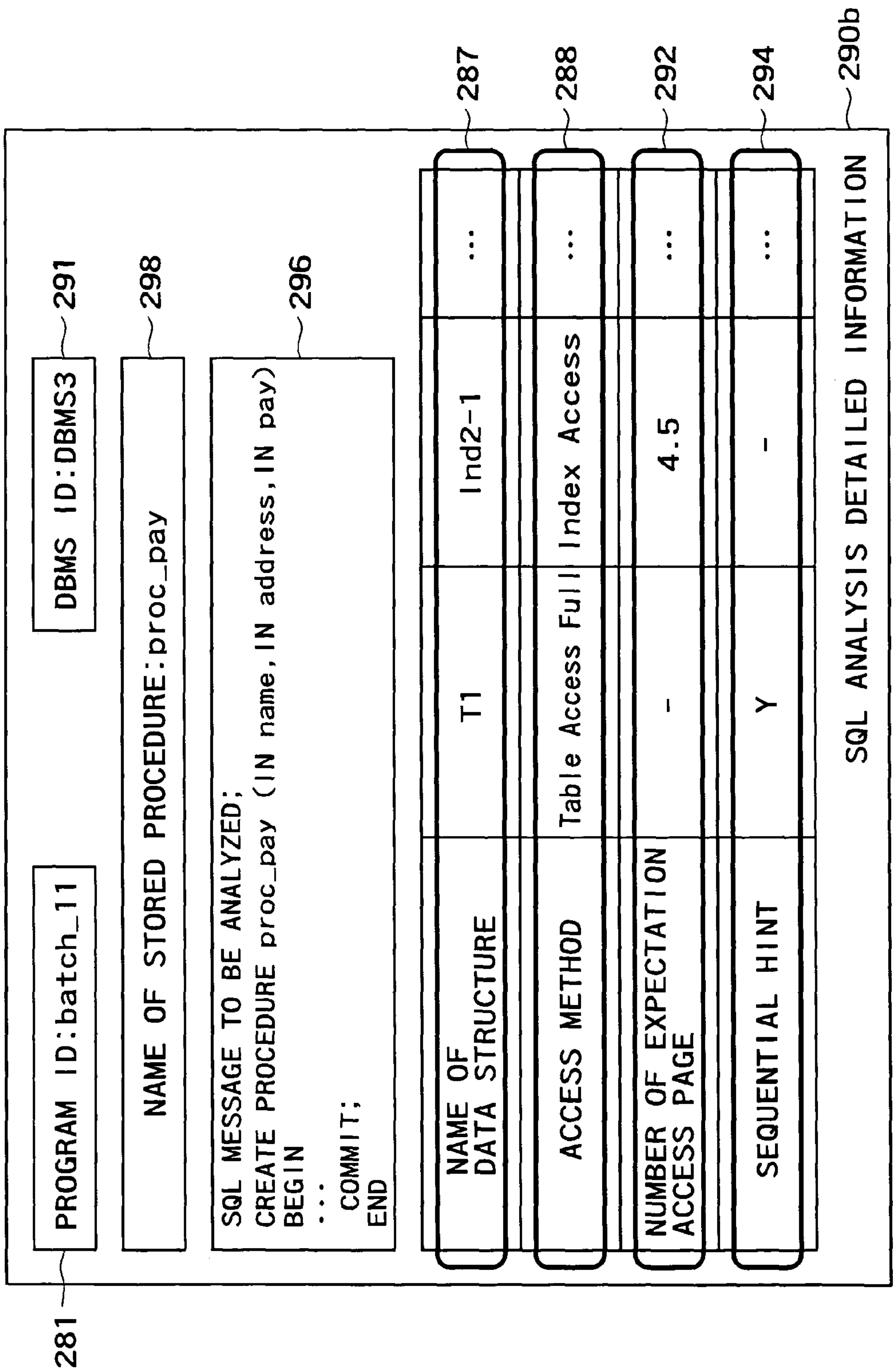
FIG. 24 is a view showing the data structure of SQL analysis detailed information 290*b;*

FIG. 24 is a view showing the data structure of the SQL analysis detailed information 290*b*. The difference between the SQL analysis detailed information 290*b* and the SQL analysis detailed information 290 lies in that, in place of the entries which hold the repeated group ID, the execution order and the driving data ID, an entry 296 which holds the analyzed SQL statement as an SQL statement which is analyzed and an entry 298 which holds the stored procedure name as the calling name of the stored procedure are added.

The method for preparing the SQL analysis detailed information 290*b* is substantially equal to the processing for preparing the SQL analysis detailed information 290 starting from step 2501. However, according to this embodiment, in this step, one stored procedure is dealt as procedure which corresponds to the repeated group in the first embodiment and, the setting processing of the repeated group ID, the execution order and the driving data ID which are set corresponding to the repeated group are not performed.

Further, the SQL analysis module 252 sets the stored procedure declaration in the entry 296 of the analyzed SQL statement and sets the calling name of the stored procedure acquired by analyzing the declaration in the entry 298 (step 2105*b*).

Further, in this embodiment, it is necessary for the Job program 100 to issue the repetition information 805*b* and the SQL hint 830. Here, the repetition information 805*b* is information indicating the start or the end of the repetition processing and, when the repetition information 805*b* indicates the start of the repetition processing, the repetition information 805*b* includes the number of repetition of the processing when necessary. The SQL hint 830 is a series of SQL statements 700 executed in the repetition processing structure to be executed hereinafter. Here, the repetition information 805*b* or the SQL hint 830 are always transmitted together with the program ID of the Job program 100 so that the program ID of the Job program 100 as a transmitter can be identified.

FIG. 25 is a view showing an example of conversion by processing which, when an embedded SQL statement is included in a source code written in C language, adds an embedded statement for having the Job program 100 to issue the repetition information 805*b* and the SQL hint 830 to the source code. This processing is performed by an SQL hint embedded module 274 in the development program 150.

In the part indicated by the range 5002 in the source code, the repetition processing is performed by the "for statement" and some SQL statements are executed in the range 5002. The SQL hint embedded module 274 identifies this repeated structure and the SQL statement is present in the repeated structure and hence, the SQL hint embedded module 274 determines that the SQL statement is executed repeatedly. In this case, the SQL hint embedded module 274, immediately before the repeated structure is started, inserts the embedded statement 5022 which makes the Job program 100 issue the repetition information 805*b* conveying the start of the repetition processing to the prefetching program 160 and the embedded statement 5026 for issuing the SQL hint 830 to the prefetching program 160. Further, the SQL hint embedded module 274, immediately after the repeated structure is finished, inserts the embedded statement 5028 which makes the Job program 100 issue the repetition information 805*b* in which the repetition processing conveys the completion to the prefetching program 160.

Here, to the embedded statement 5022, the information 5024 indicating output variables may be added for outputting the values of variables indicating the repeated time. Further, the SQL hint 830 is the information 5010 which samples the embedded SQL statement in the range 5002.

With respect to the source code, after the embedded statement which performs this hint output is added, the processing which prepares the executing form is further performed and the execution form generated in this manner is executed as the Job program 100.

Figure 26:
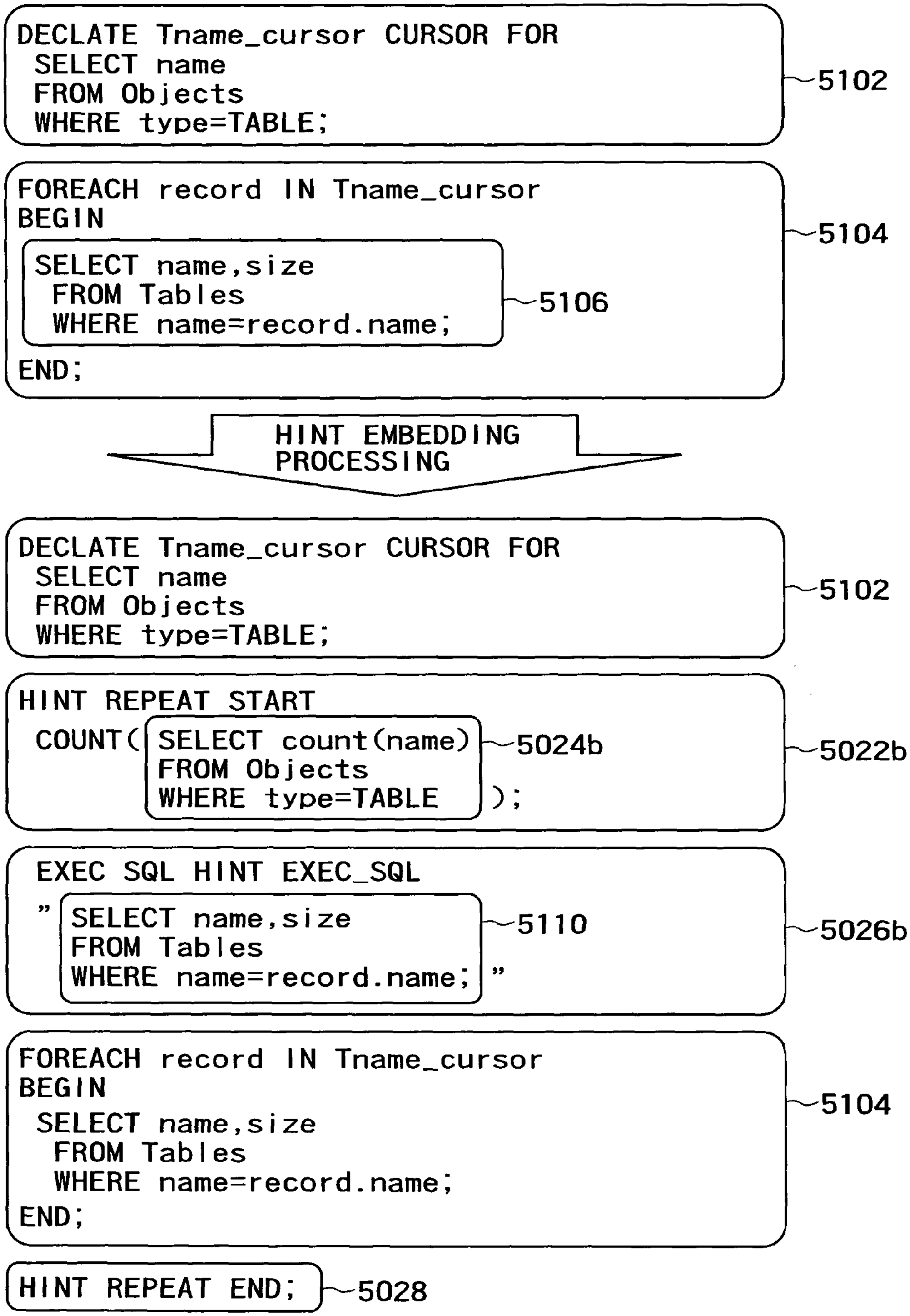
FIG. 26 is a view showing a modification of the second embodiment.

FIG. 26 is a view showing an example of the processing which, when the source code is described in SQL script and the processing is executed as the Job program 100 using the script execution program which interprets and executes the SQL script, adds the statement instructing the script execution program to issue the repetition information 805*b* and the SQL hint 830 to the SQL script.

This processing is also performed using the SQL hint embedded module 274. In the SQL script of this embodiment, the definition of cursor is performed in the range 5102 and the processing of the range 5106 is repeatedly executed for every read-out every data in the range 5104.

The SQL hint embedded module 274 identifies this repeated structure and, immediately before the range 5104 in which the repetition processing is executed, inserts the embedded statement 5022*b* which instructs the script execution program to issue the repetition information 805*b* conveying the start of the repetition processing to the prefetching program 160 and the embedded statement 5026*b* which instructs the script execution program to issue the SQL hint 830 to the prefetching program 160. Further, immediately after completion of the repeated structure, the SQL hint embedded module 274 inserts a statement 5028 for instructing issuing of the repeated information 805*b* which conveys the completion of the repetition processing to the prefetching program 160 to the script execution program. Here, to the statement 5022*b*, a statement 5024*b* which counts the number of repetition may be added so as to output a value of valuable indicative of the number of repetition. Further, the SQL hint 830 outputted from the embedded statement 5026*b* is information 5110 in which the SQL statement which is actually executed repeatedly in the range 5104 is sampled.

In executing the Job program 100, this converted SQL script is given to the script execution program and the processing is executed while outputting the repetition information 805*b* and the SQL hint 830. Further, this analysis function may be provided to the script execution program so that the generation/issuing of the repetition information 805*b* and the SQL hint 830 may be dynamically performed during the execution of the SQL script.

Hereinafter, the prefetching instruction processing which is executed by the prefetching program 160 during the execution of the Job program 100 in this embodiment is explained.

Figure 27:
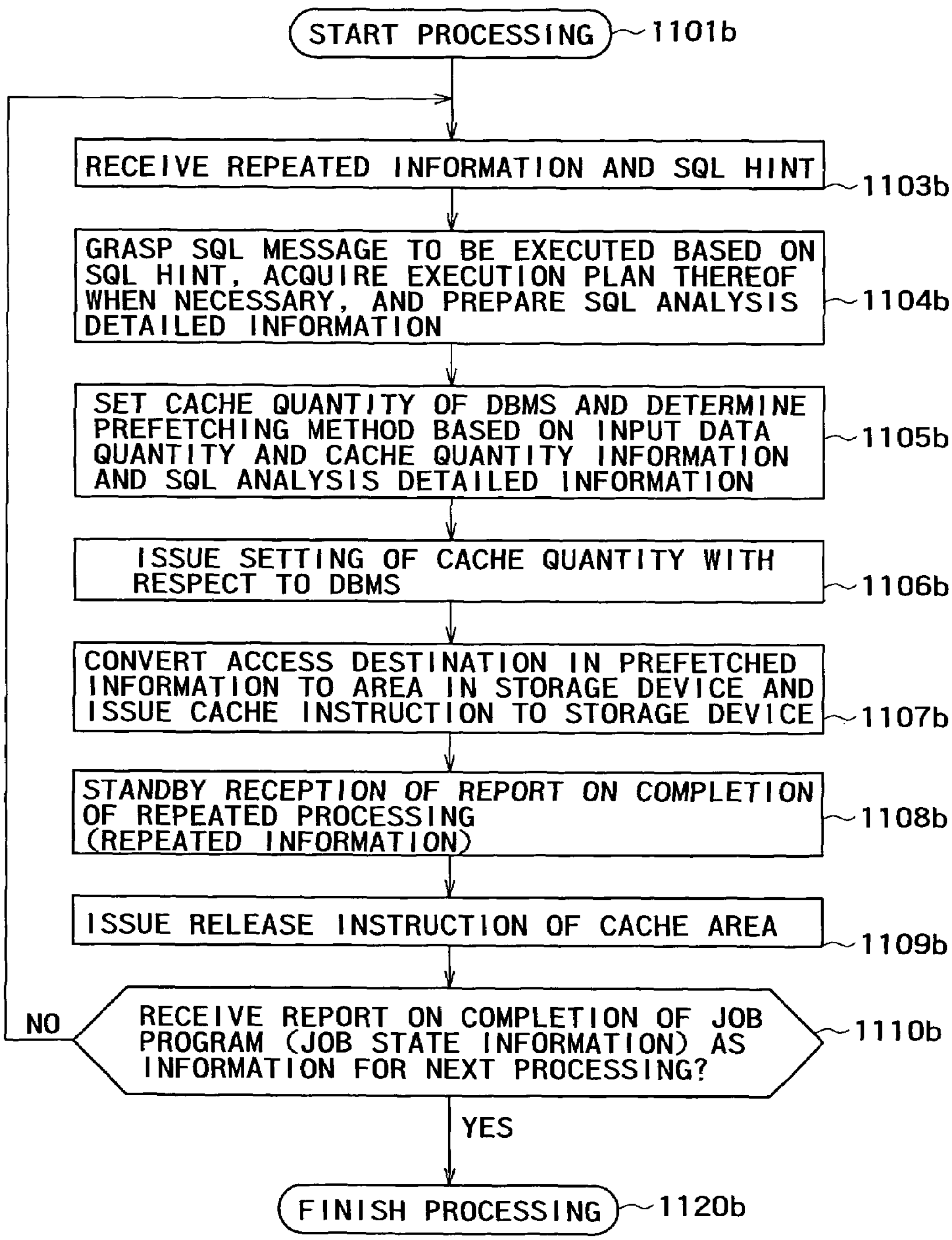
FIG. 27 is a view showing the procedure of prefetching instruction processing by the prefetching program 160 in the second embodiment.

FIG. 27 is a view showing steps of the prefetching instruction processing according to this embodiment. Further, in this embodiment, this processing is started when the prefetching program 160 receives the start of the Job program 100 as the Job state information 800 from the Job management program 130 and is finished when the prefetching program 160 receives the completion of the Job program 100 as the Job state information 800. Further, as mentioned above, the Job state information 800 may be transmitted by the Job program 100 (step 1101*b*).

First of all, the prefetching method determination module 254 of the prefetching processing program 160 receives the repetition information 805*b* and the SQL hint 830 from the Job program 100. Further, the number of repetition may be given to the repetition information 805*b* or may not be given to the repetition information 805*b* (step 1103*b*).

Subsequently, the prefetching method determination module 254 grasps the SQL statement 700 out of the SQL hint 830 and gives the SQL statement 700 to the SQL analysis module 252 and makes the SQL analysis module 252 prepare the SQL analysis detailed information 290*b* and preserve the SQL analysis detailed information 290*b* in the SQL analysis information 280. Further, in the SQL analysis detailed information 290*b* which is prepared here, no value is set in the entry 298 to hold the name of the stored procedure. Further, when a part which calls the stored procedure is present in the SQL statement 700, as the result of the analysis of that part, the information of the SQL analysis detailed information 290*b* which is prepared in response to the stored procedure is used directly.

Further, in this step, the prefetching method determination module 254 determines that the whole of SQL analysis detailed information 290*b* which is given by the SQL hint 830 corresponds to one repeated group in the first embodiment. Setting of other SQL analysis detailed information 290*b* is performed in a substantially same manner as the method described in conjunction with step 2105*b* (step 1104*b*).

Subsequently, the prefetching method determination module 254 and the prefetching instruction module 256 perform the processing from the step 1105*b* to the step 1107*b*. These processing are similar to the processing explained in conjunction with the step 1105 to the step 1107 in the first embodiment. However, there exist following differences.

First of all, the SQL analysis detailed information 290*b* to be used is prepared in the step 1104*b*. Further, there are no entry which registers the access order in the SQL analysis detailed information 290*b*. Further, in the prefetching method 720 and the cache instruction 730, the entry which holds the access order is cancelled or the entry is made to hold either an invalid value or the equal value.

Subsequently, the prefetching method determination module 254 temporarily stops the processing until the module 254 receives the report on completion of the repetition processing which constitutes the repetition information 805*b* issued by the Job program 100 (step 1108*b*).

Thereafter, the prefetching method determination module 254 issues the release instruction for releasing setting of the cache which is set in the DBMS 90 or in the storage device 40. The detail of these processing is substantially equal to the detail of the step 1109 explained in conjunction with the first embodiment (step 1109*b*).

Thereafter, the prefetching method determination module 254 enters a standby state for receiving the information from the Job program 100 or the Job state information 800. When the prefetching method determination module 254 receives the report on completion of the Job program 100 as the Job state information 800, the prefetching method determination module 254 completes the processing (step 1120*b*). When the prefetching method determination module 254 receives other information, the prefetching method determination module 254 returns to the step 1103*b* and confirms the received information (step 1110*b*).

Further, this embodiment is also applicable to a computer system in which the storage device 40 supplies the file 202 to an external device and the file 202 is accessed via the network 25 using a network file system protocol. The points which must be noted are substantially equal to those of the first embodiment.

Next, the third embodiment of the present invention is explained. In the third embodiment, the prefetching program 160 is executed such that the prefetching program 160 constitutes a front end program of the DBMS 90. The prefetching program 160, after analyzing that the given SQL statement is executed repeatedly, issues the prefetching instruction and, thereafter, transfers the SQL statement to the DBMS 90. In the third embodiment, a large number of parts thereof are identical with corresponding parts of the second embodiment. Hereinafter, only the parts of this embodiment which are different from the corresponding parts of the second embodiment are explained and the explanation of the identical parts is omitted. Further, the constitution of the computer system or the data structure of the data which is held by each device according to the third embodiment is, in principle, equal to those of the second embodiment except for following parts.

Figure 28:
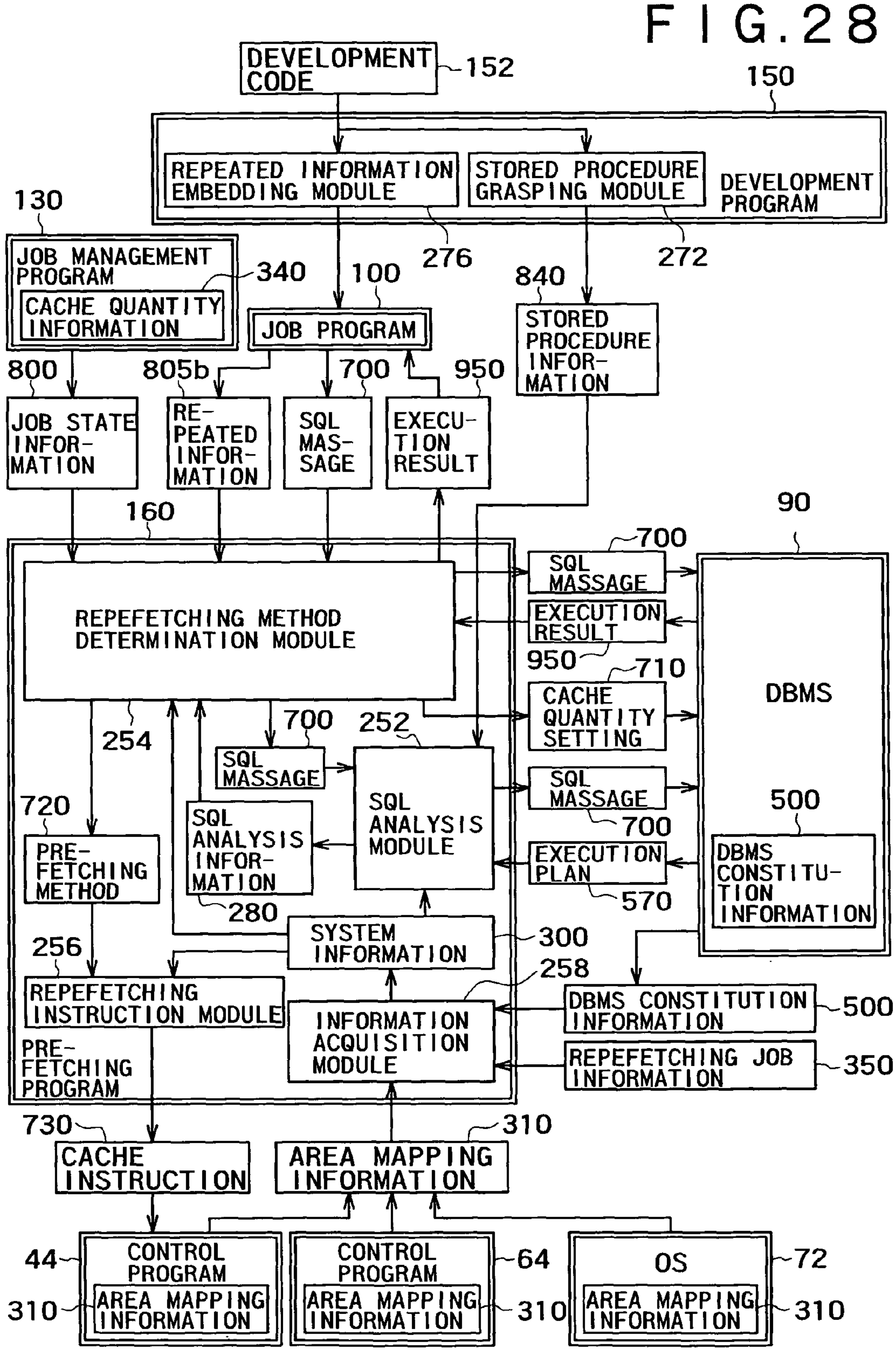
FIG. 28 is a view showing a flow of information which is exchanged among the prefetching program 160 relevant to prefetching processing and other programs in the third embodiment.

FIG. 28 is a block diagram showing the prefetching program 160 relating the prefetching processing, other programs and information which is held by these programs or exchanged among the programs in the third embodiment. When the Job program 100 is executed, instead of receiving the SQL hint 830, the prefetching program 160 receives the SQL statement 700 which is finally sent to the DBMS 90 as a processing request. Thereafter, after executing the necessary processing using the SQL statement 700, the prefetching program 160 sends the SQL statement 700 to the DBMS 90. As a result of such processing, the prefetching program 160 receives the execution result 950 from the DBMS 90 and returns the execution result 950 directly to the Job program 100. Further, although the prefetching program 160 receives the Job state information 800 from the Job management program in the drawing, the prefetching program 160 may receive the Job state information 800 from the Job program 100 in the same manner as the second embodiment.

With respect to the processing of the information collection processing which the prefetching program 160 executes in advance, the processing is equal to that of the second embodiment and the processing starting from the step 2101*b* is performed.

In this embodiment, it is necessary for the Job program 100 to issue the repetition information 805*b*. Hereinafter, the method of this embodiment is explained.

Figure 29:
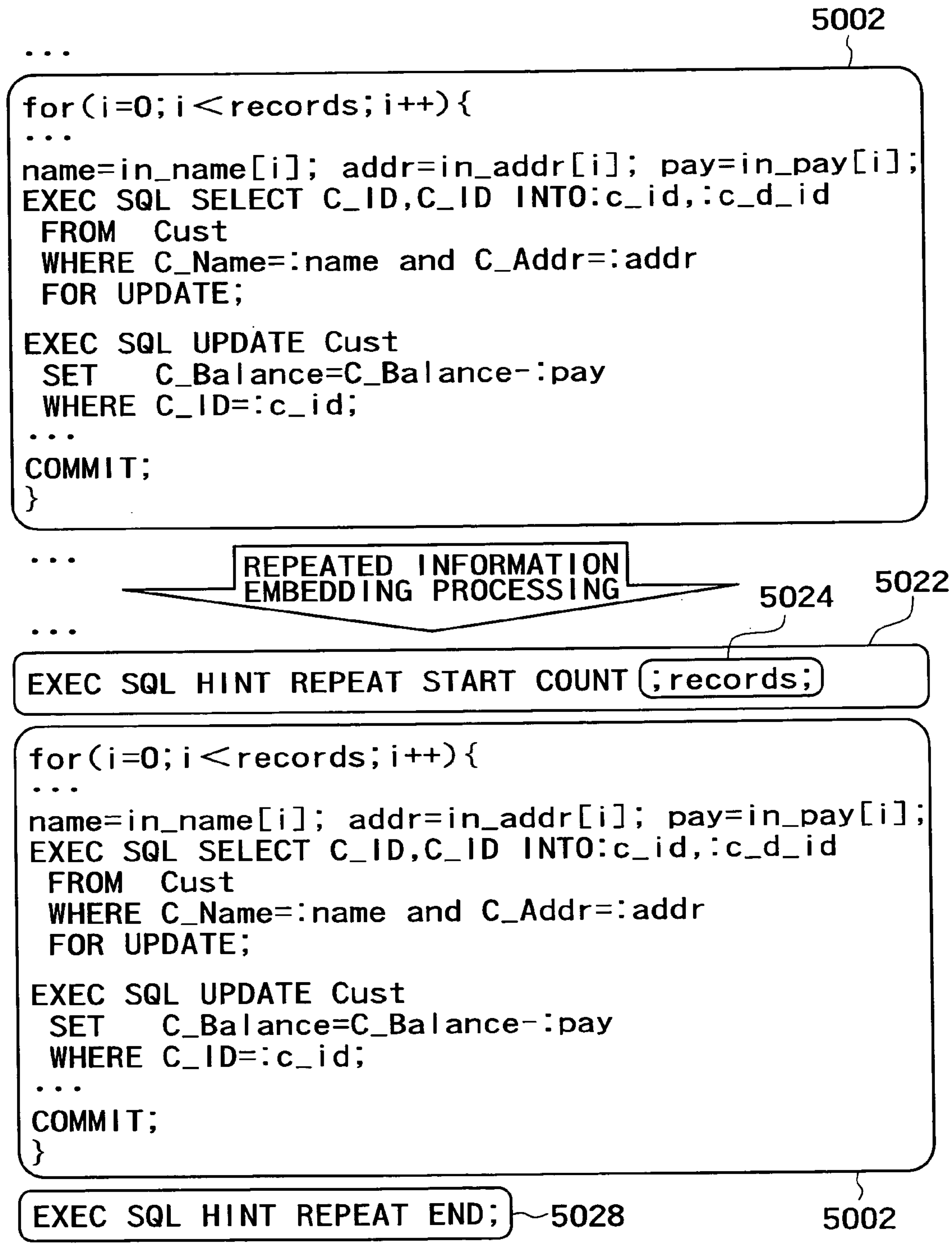
FIG. 29 is a view showing a modification of the third embodiment.

FIG. 29 is a view showing an example of conversion based on processing which adds the embedded statement which makes the Job program 100 issue a repetition information 805*b* when the source code written in C language includes the embedded SQL statement. This processing is performed by a repetition information embedded module 276 in the development program 150. Although this processing is substantially equal to the conversion performed by the SQL hint embedded module 274 in the second embodiment, this processing differs from the conversion of the second embodiment with respect to a point that the embedded statement 5026 for making the Job program 100 issue the SQL hint 830 is not inserted in the case of the repetition information embedded module 276.

Figure 30:
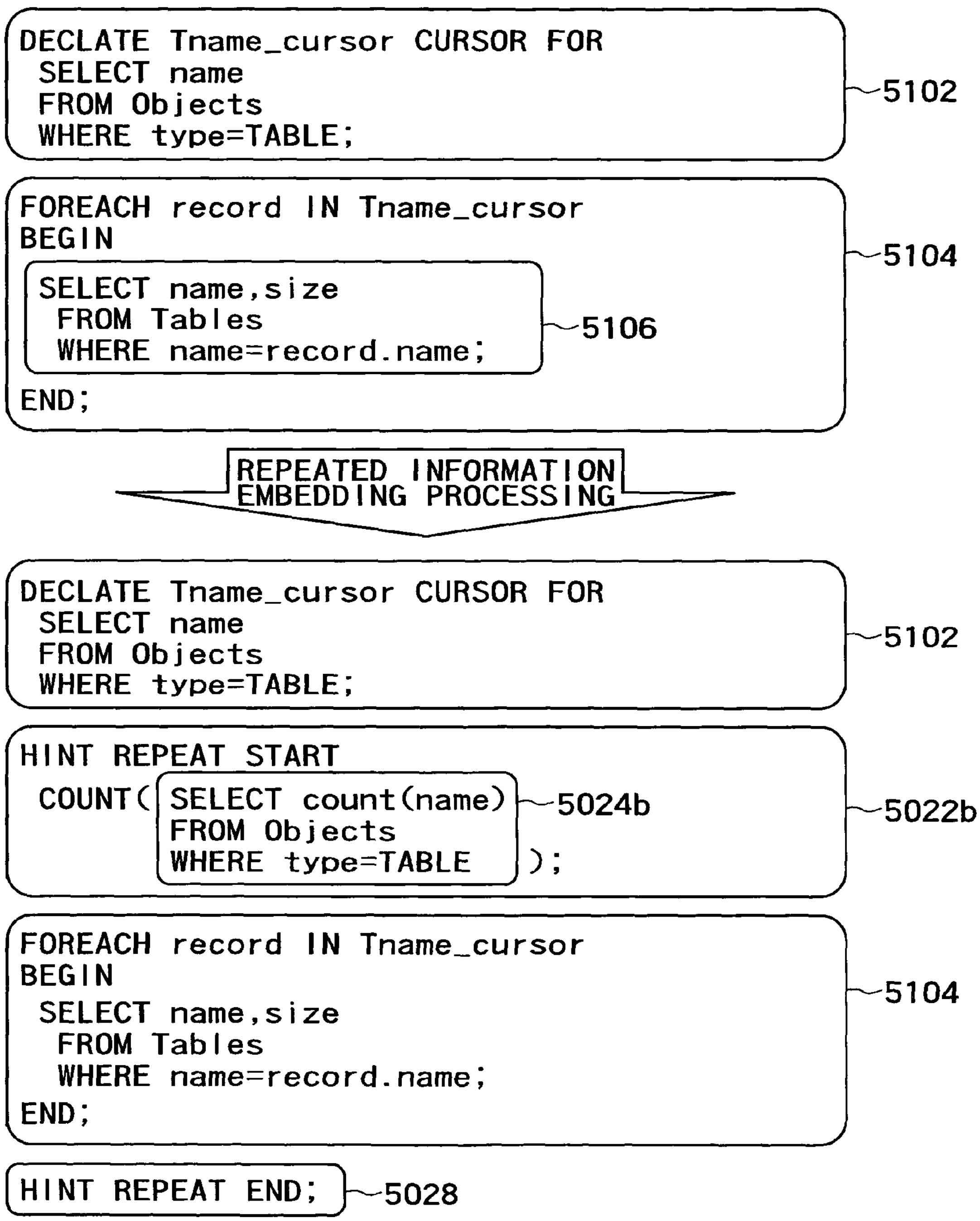
FIG. 30 is a view showing a modification of the third embodiment.

FIG. 30 is a view showing an example of conversion which is characterized by processing in which the source code is described in SQL script and when the Job program 100 is executed using the script execution program which interprets and executes the SQL manuscript, a statement which instructs the script execution program to issue the repetition information 805*b* is added. This processing is also performed by the repetition information embedded module 276. Although this processing is substantially equal to the conversion performed by the SQL hint embedded module 274, this processing differs from the conversion performed by the SQL hint embedded module 274 with respect to a point that the embedded statement 5026*b* for instructing the SQL script program to issue the SQL hint 830 is not inserted in the case of the repetition information embedded module 276.

When the Job program 100 is executed, this converted SQL script is given to the script execution program and the processing is executed while outputting the repetition information 805*b*. Further, this analysis function may be provided to the script execution program so that the generation/issuing of the repetition information 805*b* are dynamically performed when the SQL script is executed.

Figure 31:
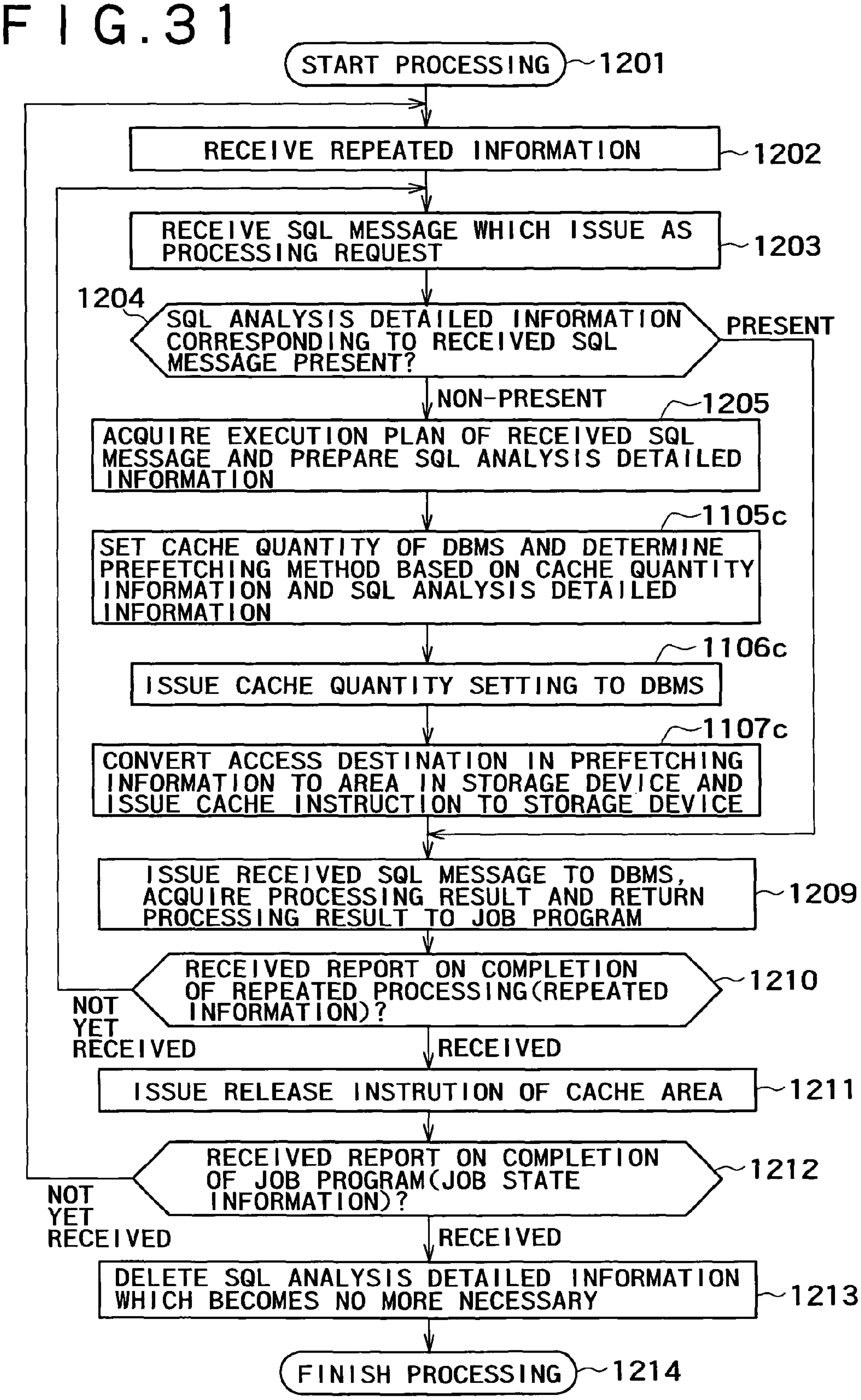
FIG. 31 is a view showing the procedure of prefetching instruction processing by the prefetching program 160 in the third embodiment.

Hereinafter, the prefetching instruction processing by the prefetching program 160 when the Job program 100 is executed in this embodiment is explained. FIG. 31 is a view showing the procedure of the prefetching instruction processing according to this embodiment. Further, in this embodiment, the processing is started when the prefetching method determination module 254 receives the start of the Job program 100 as the Job state information 800 from the Job management program 130 and is finished when the prefetching method determination module 254 receives the completion of the Job program 100 as the Job state information 800. Further, as mentioned above, the Job state information 800 may be sent by the Job program 100 (step 1201).

First of all, the prefetching method determination module 254 receives the repetition information 805*b* from the Job program 100. Further, the number of repetition may be given to the repetition information 805*b* or may not be given to the repetition information 805*b* (step 1202).

Subsequently, the prefetching method determination module 254 receives the SQL statement 700 which is issued to the DBMS 90 as the processing request from the Job program 100. Here, the SQL statement 700 is configured such that the program ID of the Job program 100 at the sender can be identified by sending the SQL statement 700 together with the program ID of the Job program 100 or the like (step 1203).

Subsequently, the prefetching method determination module 254 confirms whether the SQL analysis detail information 290*b* corresponding to the SQL statement 700 which is received in step 1203 is present in the SQL analysis information 280 or not (step 1204). When the SQL analysis detail information 290*b* is present, the procedure advances to the step 1209 and, when the SQL analysis detail information 290*b* is not present, the procedure advances to the step 1205.

When the SQL analysis detail information 290*b* is not present in the SQL analysis information 280, the prefetching method determination module 254 instructs the SQL analysis module to prepare the SQL analysis detail information 290*b* and to preserve the SQL analysis detail information 290*b* in the SQL analysis information 280 with respect to the SQL statement 700 received by the step 1203. The method for preparing the SQL analysis detail information 290*b* is similar to the method explained in conjunction with the step 1104*b* (step 1205).

Subsequently, the prefetching method determination module 254 and the prefetching instruction module 256 perform the processing from the step 1105*c* to the step 1107*c*. Although these processing are similar to the processing in the steps from the step 1105*b* to the step 1107*b* explained in conjunction with the second embodiment, there exists the following difference. Although, in the processing in the second embodiment, there is no possibility that the SQL analysis detail information 290*b* corresponding to a certain Job program 100 is increased, in this processing, the corresponding SQL analysis detail information 290*b* is increased sequentially.

Further, in determining the cache amount setting 710 and the prefetching method 720 in the step 1105*c*, the prefetching method determination module 254 newly determines the cache amount setting 710 or the prefetching method 720 which is assumed to be optimum sequentially without particularly considering the information which are already issued. Further, in step 1106*c*, when setting of the DBMS 90 before giving the instruction is preserved, setting of the DBMS 90 before starting the processing is always preserved. Further, although the prefetching method 720 is stored in the step 1107*c*, the prefetching method 720 which is stored is the last prefetching method 720 which is requested by the prefetching instruction module 256.

After the execution of the step 1207*c*, or when the SQL analysis detail information 290*b* is judged that the SQL analysis detail information 290*b* is present in the SQL analysis information 280 in the step 1204, the prefetching method determination module 254 issues the SQL statement 700 received in the step 1203 to the corresponding DBMS 90 and acquires the result of the processing. Then, the prefetching method determination module 254 directly returns the acquired result of the processing to the Job program 100 which issues the SQL statement 700 (step 1209).

Subsequently, the prefetching method determination module 254 enters a standby state to receive the information from the Job program 100 and confirms whether the report on completion of the repetition processing as the repetition information 805*b* from the Job program 100 is received or not. When the received information is information other than the report on completion, the prefetching method determination module 254 returns to the step 1203 and confirms the received information (step 1210).

When the prefetching method determination module 254 receives the report on the repeat completion processing as the repetition information 805*b*, the prefetching method determination module 254 performs the processing substantially equal to the processing explained in conjunction with the step 1109*b* in the second embodiment (step 1211).

Thereafter, the prefetching method determination module 254 enters a standby state to receive the information from the Job program 100 or the Job state information 800. When the prefetching method determination module 254 receives the information, the prefetching method determination module 254 confirms whether the information is the report on completion of the Job program 100 as the Job state information 800 or not (step 1212).

When the received information is not the report on the completion of the Job program 100 as the Job state information 800, the prefetching method determination module 254 returns to the step 1202 and confirms the received information.

When the received information is the report on completion of the Job program 100 as the Job state information 800, the prefetching method determination module 254 cancels the SQL analysis detail information 290*b* corresponding to the Job program 100 whose processing is completed from the SQL analysis information 280, wherein the SQL analysis detail information 290*b* is not the result of analysis of the stored procedure, that is, the SQL analysis detail information 290*b* has no value in the entry 298 which holds the stored procedure name. Further, the corresponding relationship of the prefetching method determination module 254 with the Job program 100 is grasped using the program ID (step 1213). Then, the processing is completed (step 1214).

This embodiment is also applicable to the computer system in which the storage device 40 provides the file 202 to the external device and the file 202 is accessed using the network file system protocol via the network 24. The points which must be noted are those points which are explained in conjunction with the first embodiment.

According to the present invention, the access performance to the storage device is improved when the processing given in the SQL statement having the same form is repeated a large number of times in the computer system in which a DBMS is driven.

What is claimed is:

1. A data prefetching method in a computer system including a first computer which a database management system operates, a storage device which is connected to the first computer, stores data of a database which the database management system manages and has a cache memory, and a second computer which is connected to the first computer and uses the data of the database, comprising the steps of:

sampling a processing content which satisfies given conditions from a content of processing which is executed by the database management system;

determining a data prefetching method based on the sampled content;

instructing prefetching of data based on the data fetching method to the storage device when the content of the processing is executed; and instructing completion of the data fetching to the storage device when the execution of the content of the processing is completed.

2. The data fetching method according to claim 1, wherein the given conditions imply conditions that portions which are repeatedly executed are included in the content of the processing.

3. The data fetching method according to claim 2, wherein the step for instructing the data prefetching includes a step for instructing a storage capacity which is ensured by the cache memory that the storage memory has.

4. The data fetching method according to claim 3, wherein the data fetching method further includes steps of:

instructing the data prefetching based on the data prefetching method also to the database management system when the data prefetching based on the data prefetching method is instructed to the storage device; and instructing the completion of the data fetching to the database management system when the completion of the data prefetching is instructed to the storage device; and wherein the step for instructing the data prefetching includes a step for instructing the storage capacity to be ensured by the cache memory which the database management system has.

5. The data fetching method according to claim 3, wherein in the step for determining the data prefetching method, information on a constitution of the database and information on mapping of a memory area in the computer system are used.

6. The data fetching method according to claim 4, wherein in the step for determining the data prefetching method, the data prefetching method is determined using information on the number of repetition of the processing.

7. The data fetching method according to claim 1, wherein the first computer and the second computer are constituted of the same computer.

8. The data fetching method according to claim 1, wherein the step for sampling the content of the processing is executed when the processing is executed using the database management system.

9. The data fetching method according to claim 8, wherein the step for sampling the content of the processing, the step for determining the prefetching method, the step for instructing the data prefetching and the step for instructing the completion of the data prefetching are executed by the first computer.

10. The data fetching method according to claim 8, wherein the step for sampling the content of the processing, the step for determining the prefetching method, the step for instructing the data prefetching and the step for instructing the completion of the data prefetching are executed by the second computer.

11. The data fetching method according to claim 8, wherein the step for sampling the content of the processing, the step for determining the prefetching method, the step for instructing the data prefetching and the step for instructing the completion of the data prefetching are executed by the storage device.

12. The data fetching method according to claim 1, wherein the step for sampling the content of the processing is executed by the second computer, and the step for determining the prefetching method, the step for instructing the data prefetching and the step for instructing the completion of the data prefetching are executed by the first computer.

13. A data prefetching program which is executed by a computer system including a computer which operates a database management system and a storage device which stores data of a database which the database management system manages and has a cache, the data prefetching program comprising:

acquiring information on a content of processing which is executed by the database management system;

acquiring information on mapping of data respectively from the database management system, the computer and the storage device;

acquiring information indicative of starting of processing;

determining a data prefetching method using the acquired information;

giving the data prefetching method to the storage device;

acquiring information indicative of completion of processing; and instructing releasing of the data prefetching method to the storage device.

14. The storage medium storing the data prefetching program according to claim 13.

15. A program for managing prefetching of data of as a cache which is executed in a computer system including a storage device which has a plurality of logical disk devices which stores data and a cache which stores a copy of the data stored in the logical disk devices and a database management system DBMS which executes management of reading and writing of the data from the storage device, the program comprising:

an information acquisition module for acquiring information on a prefetching job including information on a program of an object which issues a prefetching instruction and information on a DBMS constitution from the DBMS, an SQL analysis module for grasping a repetition group based on information on SQL statements (statements described in a structural inquiry language in the same form) which a job program designated by the acquired prefetching job information issues and, at the same time, for setting a structure of access data and an access method based on an execution plan of the SQL statements acquired from the DBMS;

a prefetching method determination module for determining a cache amount of the DBMS and a cache prefetching method based on information analyzed by the SQL analysis module and information on an input data amount and a cache amount as repetition information acquired from a job management program; and a module for instructing prefetching which issues the prefetching method determined by the prefetching method determination module to the storage device which constitutes an access destination.

16. A management method which is executed in a computer system including a storage device which has a plurality of logical disk devices which store data and a cache which stores a copy of the data stored in the logical disk devices and a database management system DBMS which executes management of reading and writing of the data from the storage device, the management method comprising:

a step for acquiring information on a prefetching job including information on a program of an object which issues a prefetching instruction and information on a DBMS constitution from the DBMS, a step for an SQL analysis for grasping a repetition group based on information on SQL statements which a job program designated by the acquired prefetching job information issues and, at the same time, for setting a structure of access data and an access method based on an execution plan of the SQL statements acquired from the DBMS;

a prefetching method determination step for determining a cache prefetching method based on information analyzed by the SQL analysis and information on an input data amount as repetition information acquired from a job management program; and a step for instructing prefetching which issues the prefetching method determined by the prefetching method determination module to the storage device which constitutes an access destination.

17. The management method according to claim 16, wherein the prefetching method determination step sets a storage capacity to be ensured in the cache.

18. The management method according to claim 17, wherein information which is determined by the prefetching method determination step and is transmitted to the prefetching instruction step adopts a data structure which includes information on a name to the data structure, a cache prefetching method including sequential reading or instantaneous reading, IDs of logical disk devices and a cache amount.

19. The management method according to claim 16, wherein information for instructing prefetching which is transmitted to the storage device adopts a data structure which includes identifiers of logic structures indicating data areas of the storage device, the determined cache prefetching method, the cache amount and information indicative of an order of access.

20. The management method according to claim 16, wherein the management method further includes a step which instructs the DBMS and the storage device to release a setting of the cache which is already set in the DBMS and the storage device upon reception of completion of execution of the job program.

* * * * *